United States Patent [19]

Comer

[11] Patent Number: 5,588,042
[45] Date of Patent: Dec. 24, 1996

[54] INTERACTIVE ROAMER CONTACT SYSTEM FOR CELLULAR MOBILE RADIOTELEPHONE NETWORK FOR AUTOMATICALLY INITIATING A COMMUNICATION WITH AN AUTONOMOUSLY REGISTERING CELLULAR MOBILE RADIOTELEPHONE

[75] Inventor: Edward I. Comer, Marietta, Ga.

[73] Assignee: BellSouth Corporation, Atlanta, Ga.

[21] Appl. No.: 468,794

[22] Filed: Jun. 6, 1995

Related U.S. Application Data

[63] Continuation of Ser. No. 647,719, Jan. 28, 1991.

[51] Int. Cl.⁶ ...................................................... H04Q 7/22
[52] U.S. Cl. ................................. 379/59; 379/89; 379/58; 379/91
[58] Field of Search ........................ 379/59, 91, 58, 379/89, 57, 60; 358/84

[56] References Cited

U.S. PATENT DOCUMENTS

| | | | |
|---|---|---|---|
| 3,806,804 | 4/1974 | Mills et al. .......................... | 325/55 |
| 4,178,476 | 12/1979 | Frost . | |
| 4,583,217 | 4/1986 | Kittel .................................. | 370/29 |
| 4,644,351 | 2/1987 | Zabarsky et al. . | |
| 4,658,416 | 4/1987 | Tanaka . | |
| 4,670,905 | 6/1987 | Sandvos et al. . | |
| 4,700,374 | 10/1987 | Bini . | |
| 4,723,264 | 2/1988 | Sasuta et al. . | |
| 4,737,978 | 4/1988 | Burke et al. . | |
| 4,748,655 | 5/1988 | Thrower et al. . | |
| 4,752,951 | 6/1988 | Konneker . | |
| 4,761,807 | 8/1988 | Matthews et al. .................... | 379/89 |
| 4,775,999 | 10/1988 | Williams . | |
| 4,814,763 | 3/1989 | Nelson et al. . | |
| 4,827,499 | 5/1989 | Warty et al. . | |
| 4,833,701 | 5/1989 | Comroe et al. . | |
| 4,833,702 | 5/1989 | Shitara et al. . | |
| 4,901,340 | 2/1990 | Parker et al. . | |
| 4,935,956 | 6/1990 | Hellwarth et al. ................... | 379/112 |
| 4,958,368 | 9/1990 | Parker ................................. | 379/91 |
| 5,046,082 | 9/1991 | Zicker et al. ........................ | 379/59 |
| 5,090,050 | 2/1992 | Heffeman ............................ | 379/60 |
| 5,227,874 | 7/1993 | Von Kohorn ........................ | 358/84 |
| 5,301,223 | 4/1994 | Amadon et al. ..................... | 379/58 |
| 5,375,161 | 12/1994 | Fuller et al. ......................... | 379/57 |
| 5,432,841 | 7/1995 | Rimer .................................. | 379/59 |
| 5,485,505 | 1/1996 | Norman et al. ...................... | 379/58 |

FOREIGN PATENT DOCUMENTS

| | | | |
|---|---|---|---|
| 2234649 | 2/1991 | United Kingdom ................ | 379/59 |

OTHER PUBLICATIONS

America On-Line, "Cellular provider Selects AvData System to Provide Links to Roaming and Verification Clearinghouses" Jul. 1995.

(List continued on next page.)

*Primary Examiner*—William Cumming
*Attorney, Agent, or Firm*—Jones & Askew

[57] ABSTRACT

An automated interactive customer class identification and contacting system for use in or for a cellular mobile radiotelephone (CMR) system. A mobile radiotelephone provides identification information as it originates a call or registers into the CMR system by powering up or initially entering the area of coverage of a cell. This identification information is monitored by a detection module, and predetermined identifying characteristics derived from the identification information identify the registering mobile radiotelephone as a member of a predetermined class, such as roamers. An interactive module places a telephone call to the registering mobile radiotelephone and provides synthesized voice message information targeted to the specific class of radiotelephones, for example, roamers. The interactive module is further responsive to DTMF inputs from the user of the telephone, for example to select services offered by the cellular system operator, block further solicitations, provide information requested by the cellular system operator, and the like. A database module stores information associated with the mobile telephone such as acceptance or rejection of services, last time of detection or solicitation, and the like.

120 Claims, 7 Drawing Sheets

OTHER PUBLICATIONS

America On–Line, "Seamless Roaming: Featurs that Follow You" Sep. 1995.

Mobile Station–Land Station Compatibility Specification, EIA/TIA–553 Standard Electronic Industries Association, Engineering Dept., Sep. 1989.

Cellular Radiotelecommunications Intersystem Operations: Functional Overview, IS–41.1 (Rev. B) EIA/TIA, Electronic Industries Association, Engineering Dept., Feb. 1991.

INTERACTIVE ROAMER CONTACT SYSTEM FOR CELLULAR MOBILE RADIOTELEPHONE NETWORK FOR AUTOMATICALLY INITIATING A COMMUNICATION WITH AN AUTONOMOUSLY REGISTERING CELLULAR MOBILE RADIOTELEPHONE

This is a continuation of application Ser. No. 07/647,719, filed Jan. 28, 1991, now allowed.

TECHNICAL FIELD

The present invention generally relates to cellular mobile radiotelephone (CMR) communication systems, and more particularly relates to methods and apparatus for automatically detecting the presence of predetermined classes of mobile radiotelephones within the cellular network, such as roamers, and for automatically and interactively communicating with a registering mobile radiotelephone within such classes. For example, the present invention is suitable for detecting roamers, placing a call to a detected roamer, providing a predetermined synthesized voice message (such as information concerning the availability of roaming services within the network), and receiving responses provided via the telephone keypad.

BACKGROUND

Cellular mobile radiotelephone (CMR) service has been in widespread use for several years. Typical systems are characterized by dividing a radio coverage area into smaller coverage areas or "cells" using low power transmitters and coverage-restricted receivers. CMR systems are described in U.S. Pat. Nos. 3,906,166 and 4,268,722. As will be known to those skilled in the art, the limited coverage area enables the radio channels used in one cell to be reused in another cell. As a cellular mobile radiotelephone within one cell moves across the boundary of the cell and into an adjacent cell, control circuitry associated with the cells detects that the signal strength of the telephone in the just-entered cell is stronger, and communications with the radiotelephone are "handed off" to the just-entered cell.

A cellular mobile radiotelephone system typically utilizes a pair of radio frequencies for each radio channel in each cell. Each cell typically includes at least one signalling channel (also called a control or access channel) and several voice channels. The signalling channel is selected or dedicated to receive requests for service from mobiles or portables, to page selected mobiles or portables, and to instruct the mobiles or portables to tune to a predetermined voice channel where a conversation may take place. The signalling channel is responsible for receiving and transmitting data to control the actions of the mobiles and portables.

The data message and radio channel specifications for U.S. cellular radiotelephone systems are set forth in Electronic Industries Association/Telecommunications Industry Association (EIA/TIA) Standard 533 (previously known as Interim Standard CIS-3) implemented in accordance with 47 C.F.R. 22, in the Report and Orders pertaining to Federal Communications Commission (FCC) Docket No. 79-318. Copies of the EIA/TIA-533 may be obtained from the Engineering Department of the Electronic Industries Association at 2001 Pennsylvania Avenue, N.W., Washington, D.C. USA 20006.

Increasingly, users of cellular mobile radiotelephones travel between cities having cellular systems operated by different operating companies. In addition, the FCC has established that each area wishing to establish a cellular telephone network may have up to two cellular system operators, and therefore parallel but separate systems are in place in most major metropolitan areas. While the mobile radiotelephones for use in these different systems are identical, the cellular systems are configured so that only cellular telephones which are identified as "home" units or subscribers within a given cellular system may communicate within a given operator's system.

It is known that when a cellular mobile radiotelephone originates a call, it transmits a series of data messages to the serving cell. These messages, referred to as a Call Origination, are defined by EIA/TIA-533. These data messages always contain the low order seven digits of the unit's telephone number, known as the Mobile Identification Number (MIN), the unit's Station Class Mark (SCM), which identifies functional characteristics of the unit, and the Called Address, or dialed telephone number. Although optional, cellular system operators typically also require additional data words to be transmitted that contain the MIN2, which is the high order three digits or NPA of the cellular unit's telephone number, and the Electronic Serial Number (ESN).

These data messages are provided first to the cell, and then through a data link to the mobile telephone switching office ("MTSO"). The MTSO, also known as "the switch", makes voice connections between mobile radiotelephones and the main telephone network. At the MTSO, a determination is typically made whether the radiotelephone is an authorized user or subscriber by looking up the telephone number, serial number, and other information provided by the radiotelephone to see if there is an entry in the MTSO's database corresponding to that particular telephone. Part of the normal, but optional, functions of an MTSO is to validate that the ESN and MIN received as part of a Call Originalion message are valid. If the MIN is valid and "home", the received ESN is compared to the MTSO's database ESN entry to detect fraud. If these checks succeed, the call is allowed to proceed.

It is also known that a cellular mobile radiotelephone, when it first powers up or first enters the cell of a CMR system when already powered up, can optionally be instructed to identify itself as actively present within a particular cell and on the system. The radiotelephone identifies itself or "registers" through a process known as Autonomous Registration by providing a data packet similar to that of a Call Origination. The original design intent of Autonomous Registration was to improve the efficiency of potential future call deliveries by keeping the MTSO informed of the approximate whereabouts of each individual cellular unit, and to reduce paging channel load by lessening the need to page all cells to find a cellular unit. When the MTSO is thus informed, it can "page" (i.e., attempt to ring) the cellular unit only in the cell or area that it was last known to be in. Additional cells would be paged only if the mobile was not found with the initial page.

While most cellular systems support the Autonomous Registration feature, processing of the received identification information is usually proprietary to the vendor of the MTSO equipment. However, it will be observed that the data contained in an Autonomous Registration message is essentially the same as a Call Origination. The difference is that an Autonomous Registration is not associated with a call attempt, and is not necessarily used to validate a cellular unit's ability to place or receive calls. Instead, an Autonomous Registration is simply a set of messages periodically and autonomously sent from the mobile to the serving cell at an interval specified in data parameters previously received from the cell by the cellular unit.

For purposes of the present application, the terms "register", "registration", etc. will be used to denote the provision of identification information by Call Origination, Autonomous Registration, or other means.

It is further known that in CMR systems, a subscriber's ability to receive incoming calls outside his or her home service area is restricted. A subscriber using or attempting to use his or her cellular mobile radiotelephone in a service area outside his home service area is said to be "roaming", and he or she is commonly referred to as a "roamer". When cellular telephone subscribers leave the area of their subscribed service, they frequently do not use their cellular telephones because they do not know (or have forgotten) the particular procedures for operating their radiotelephone as a "roamer" in the newly-entered service area. Lack of use of the radiotelephone in different service areas results in a loss the benefits of cellular telephone service to the subscriber, and a loss of revenue both from the calls that would otherwise be made by the roamer and from calls to the roamer which cannot be completed because the roamer's home service area does not know where to forward the calls.

Even though a subscriber is not always aware of having travelled beyond the range of the home service area, CMR systems are designed to detect this situation and so apprise the user, in the following manner. Each cellular system has been uniquely assigned a System IDentification (SID) number. Electrical signals corresponding to each cellular system's SID are continuously transmitted by that system over a control channel. The SD of the system from which a particular subscriber has agreed to acquire CMR services is programmed into a Numerical Assignment Module (NAM) or memory incorporated into the subscriber's mobile radiotelephone unit.

When a subscriber's mobile radiotelephone unit is "powered up" or first enters the area of coverage of a CMR system when already powered up, it selects the strongest detectable control channel and receives a system parameter overhead message in the form of an overhead message train (OMT). The OMT includes the 15-bit SID of the CMR system whose signal the mobile unit is receiving. The mobile unit then compares the transmitted SID to the SID programmed into its NAM to determine identicality. If the unit determines lack of identicality, it is indicated that the unit is "roaming". In many cellular radiotelephone units, a "roam" indicator light is activated on the control panel associated with the unit. In this manner, a subscriber is made aware that his or her mobile radiotelephone unit has seized or entered a system other than the system on which he or she is an authorized subscriber.

A roamer who desires to place an outgoing call typically must then access the CMR system in which he or she is roaming through procedures established by the CMR system operator. These procedures typically involve special codes, key sequences, and information solicitation from the subscriber so that the roamer is aware that he or she will be billed at the rates established for roaming services (instead of the usual "home" service rate).

Further difficulties are encountered when a roamer desires to receive incoming calls when in a foreign service area. In order for a roamer to receive incoming calls, it is typically required that would-be third-party callers know the whereabouts of the subscriber. Unanswered calls placed to the subscriber's home number are typically answered with a message indicating that the subscriber cannot be found. If the caller knows the CMR system in which the roamer is present, then there are procedures provided for accessing the subscriber through the facilities of that CMR system. This requires the caller to know the roamer's itinerary and the roamer access number of the CMR system in which the roamer is present. Many major service areas have a 10-digit roamer access number. Armed with this and other information, a would-be caller may dial the 10-digit roamer access number of the CMR system in which the roamer is present. Then, the caller dials the roamer's home number, including home area code, and the call will be delivered.

This unwieldy procedure can sometimes be exacerbated by the need for the subscriber to arrange the right to have incoming calls delivered with the CMR service provider in the foreign area.

Needless to say, procedures for arranging for roaming service such as these require advance planning, scheduling, and dissemination of itinerary information to persons who may want to call the subscriber in a foreign service area. These cumbersome procedures inhibit the flexibility and freedom prized by many cellular telephone subscribers, and also reduce the likelihood that a subscriber will avail himself or herself of roaming services in a foreign area. Moreover, the requirement for advance arrangement of roaming services simply precludes the use of roaming services by subscribers who, because of reasons beyond their control and foresight, find themselves in a foreign service area without any guidance as to the procedures for access to roaming services, and must place a call or other inquiry to the CMR system operator. Obviously, the subscribers in such circumstances are deprived of the convenience and benefit of their cellular mobile radiotelephones and the CMR system operators miss the opportunity to earn revenue.

Some CMR systems, for example, U.S. Pat. No. 4,901,340, of Parker et al., "System for the Extended Provision of Cellular Mobile Radiotelephone Service", also known as the GTE Mobilenet Incorporated "Follow-Me-Roaming" (trademark) service, are provided to ameliorate many of these difficulties and make the use of roaming services in foreign service areas more convenient. However, even with such services as the "Follow-Me-Roaming" service, it is required that the "Follow-Me-Roaming" service system hardware and software be implemented in the CMR system. Such systems, although they provide many advantages to roamers, do not accommodate the roamers who are from systems that do not have the "Follow-Me-Roaming" service or other types of following services. Again, the subscribers are deprived of the benefit of their cellular mobile radiotelephones and the CMR systems lose revenue from potential customers.

When considering the nature of the problem with accommodating roamers, the present inventor has discovered certain key aspects of the nature of the difficulty with roaming services. One key aspect in the provision of convenient roaming services involves the detection of the presence of roamers, who by definition are not subscribers in the CMR system, within a CMR system. Once the roamers are detected, another key aspect is the ability to contact these roamers for the purpose of providing information in a convenient manner concerning access to roaming services.

Considered in these terms, yet another key aspect involves the detection that a particular mobile radiotelephone is a member of a certain class of mobile radiotelephones, for example, roamers, or home unit owners of a certain type of mobile radiotelephone, or home subscribers having a certain prefix in his or her NPANXXXXXX. Once the presence of members of a certain class have been detected as present (and active) in the CMR system, it is possible to consider directing a class-targeted communication to members of that certain class, by placing calls to members of the class with an automated contacting means. As examples, for roamers, information concerning the provision of roaming services may be provided; for owners of certain types of telephones, information concerning newly available features may be provided; for subscribers having a certain prefix in his or her telephone number, an automated survey may be conducted or the acceptance of particular special telephone services provided by the CMR system operator (e.g. voice messaging or call waiting) may be interactively solicited.

Prior to the present invention, there has been no way to selectively determine whether a registering mobile radiotelephone is a roamer, or a home unit, or for that matter, to determine whether the registering mobile radiotelephone possesses other predetermined class characteristics, and to provide services to directed specifically to that class of telephones. Accordingly, there is a need for an automated system capable of detecting mobile radiotelephones by class, for example roamers, and for proactively contacting selected mobile radiotelephones for the purpose of the providing provision of information and interactive service solicitation.

SUMMARY OF THE INVENTION

Briefly described, the present invention is a computer-based electronic system that provides selected cellular customers, differentiated on the basis of predetermined identifying characteristics provided upon electronic registration into the cellular system, with electronically digitized voice information, and that recognizes and acts upon TOUCH-TONE® customer responses. The system is capable of determining that a customer's mobile radiotelephone is turned on, within the range of the cellular telephone system, and is therefore ready to receive calls. This particular capability differentiates the system from pre-existing automated telephone solicitation systems, and enhances the probability of reaching a cellular customer as soon as he or she has entered the coverage area of the cellular telephone system.

More particularly described, the present invention comprises an automated customer class identification and contacting system. A monitoring means detects identification information provided by a mobile radiotelephone as it originates a call, powers up, or initially enters the area of coverage of a cell of the CMR system. Means responsive to the identification information detects predetermined identifying characteristics of the registering mobile radiotelephone, for example, whether the unit is a roamer, is a home unit, possesses a telephone number with a predetermined prefix, or is of a particular manufacturer's type. Communicating means responsive to detection of a selected predetermined identifying characteristic of the registering mobile radiotelephone then communicates with registering mobile radiotelephones having the selected predetermined identifying characteristic.

In particular, the communicating means comprises an interactive circuit for delivering synthesized voice messages to the registering mobile radiotelephone, and interactively receiving responses to the voice messages. In the preferred embodiment, the communicating means is operative to place a telephone call to registering mobile radiotelephone, generate a synthesized voice message corresponding to a preprogrammed voice message script, and deliver the synthesized voice message to the registering mobile radiotelephone. Interactive responses to the voice messages are preferably received in the form of TOUCH-TONE® key entries by the radiotelephone user.

While a particular function of the present invention is to differentiate between local or home units of the CMR system and roamers, it should be understood that the system is capable of detecting other predetermined identifying characteristics of mobile radiotelephones. For example, the system is capable of detecting portions of the mobile telephone number (MIN) associated with mobile radiotelephone, the station class mark (SCM) identifier, the electronic serial number (ESN) associated with the telephone, and the like.

Still more particularly described, the present invention comprises means for monitoring identification information provided by a mobile radiotelephone as it originates a call or registers into a CMR system by powering up or initially entering the area of coverage of a cell of the CMR system. The monitoring means receives the identification information by a connection or tap to the cell/MTSO dam link, or alternatively as an output from the MTSO. The identification information typically comprises the mobile telephone number, electronic serial number, and station class mark identifier of the mobile radiotelephone, in the form of a serial data stream between the cell and the MTSO, or alternatively as an output from the MTSO.

A database is provided for storing status information associated with various radiotelephones which are present with the system, either actively or have been indicated as subscribing customers. Detection means operatively connected to the monitoring means is responsive to the identification information, and conducts a search of the database based upon information contained in the serial data stream. A determination is made whether the detected mobile radiotelephone is within a predetermined class of mobile radiotelephones, for example a roamer, and generates a signal indicating that the detected and registering radiotelephone is a member of a predetermined class. The detection means further determines whether the system is programmed to contact this particular class of radiotelephones, and if so, generates a solicitation request targeted to registering mobile radiotelephone.

Solicitation means responsive to the solicitation request solicits the detected mobile radiotelephone, now determined to be a member of a selected class, by placing a call to the mobile telephone number of the detected mobile radiotelephone. Interactive response detection means then determines the response of the detected mobile radiotelephone to the call placed by the solicitation means, typically in the form of TOUCH-TONE® entries, and provides a response information output. This interactively-solicited information output is then used to update the database to reflect several categories of information. For example, one response can be an indication that further solicitations are not desired. Another response can be the acceptance of the offering of services provided to the class of customers, for example, the provision of roaming services to detected roamers. Yet another response can be the failure of the solicitation means to successfully contact the detected mobile radiotelephone and receive an active response to an inquiry, in which case the status information is updated to reflect that the detected mobile radiotelephone has not yet been successfully contacted or solicited.

Accordingly, it is an object of the present invention to provide an automated information provision and solicitation system for cellular mobile radiotelephones.

It is another and specific object of the present invention to provide an automated roamer detection and solicitation system that detects the presence of roamers within a cellular mobile radiotelephone network and delivers a predetermined roaming service solicitation message to detected roamers.

It is another and more general object of the present invention to provide a system for detecting the presence of registering cellular mobile radiotelephones having predetermined identifying characteristics as the telephones originates a call, powers up, or enters the area of coverage of a cell of the CMR system, and communicating with a detected mobile radiotelephone for the purpose of providing or soliciting information from the detected telephone.

It is another object of the present invention to provide a system for providing class targeted communications and solicitations directed to members of a predetermined class of mobile radiotelephones, with a system operative to place telephone calls to detected mobile radiotelephones having predetermined identifying characteristics.

It is another object of the present invention to provide a cellular mobile radiotelephone class member detection system for use in a CMR network which is operative to detect the presence of units having predetermined identifying characteristics such as roamers that have not previously been detected, new telephones that have not yet been entered into the system as a registered user, survey information directed to members of a certain class, and the like.

It is yet another object of the present invention to provide an automated interactive cellular telephone customer class identification and contacting system which is capable of determining whether a registering mobile radiotelephone has never been solicited, or has not been detected nor solicited within a predetermined time period, and is thereafter operative to solicit the registering mobile telephone for purposes of providing information or soliciting the selection of services.

It is another object of the present information to provide an automated and interactive cellular mobile radiotelephone customer class identification and contacting system which employs a programmable synthesized voice message generating subsystem so that synthesized voice messages for different class-targeted informational messages and solicitations can be easily and conveniently generated and modified, and in which various different voice messages can be readily provided on a scheduled basis to selected identified customers, for the purpose of soliciting the usage of services or providing consumer information directed only to particular classes of customers.

It is another object of the present invention to provide an automated and interactive cellular mobile radiotelephone customer contacting system that "knows" that a customer's mobile is turned on, within range of the cellular telephone system, and thus ready to receive calls. This capability sets the present invention apart from known automated telephone solicitation systems, and greatly enhances the probability of reaching a cellular customer as soon as he or she has entered the coverage area of the CMR system.

These and other objects, features, and advantages of the present invention may be more clearly understood from a review of the following detailed description and drawings and by reference to the appended claims.

DETAILED DESCRIPTION OF THE PREFERRED EMBODIMENT

Figure 1:
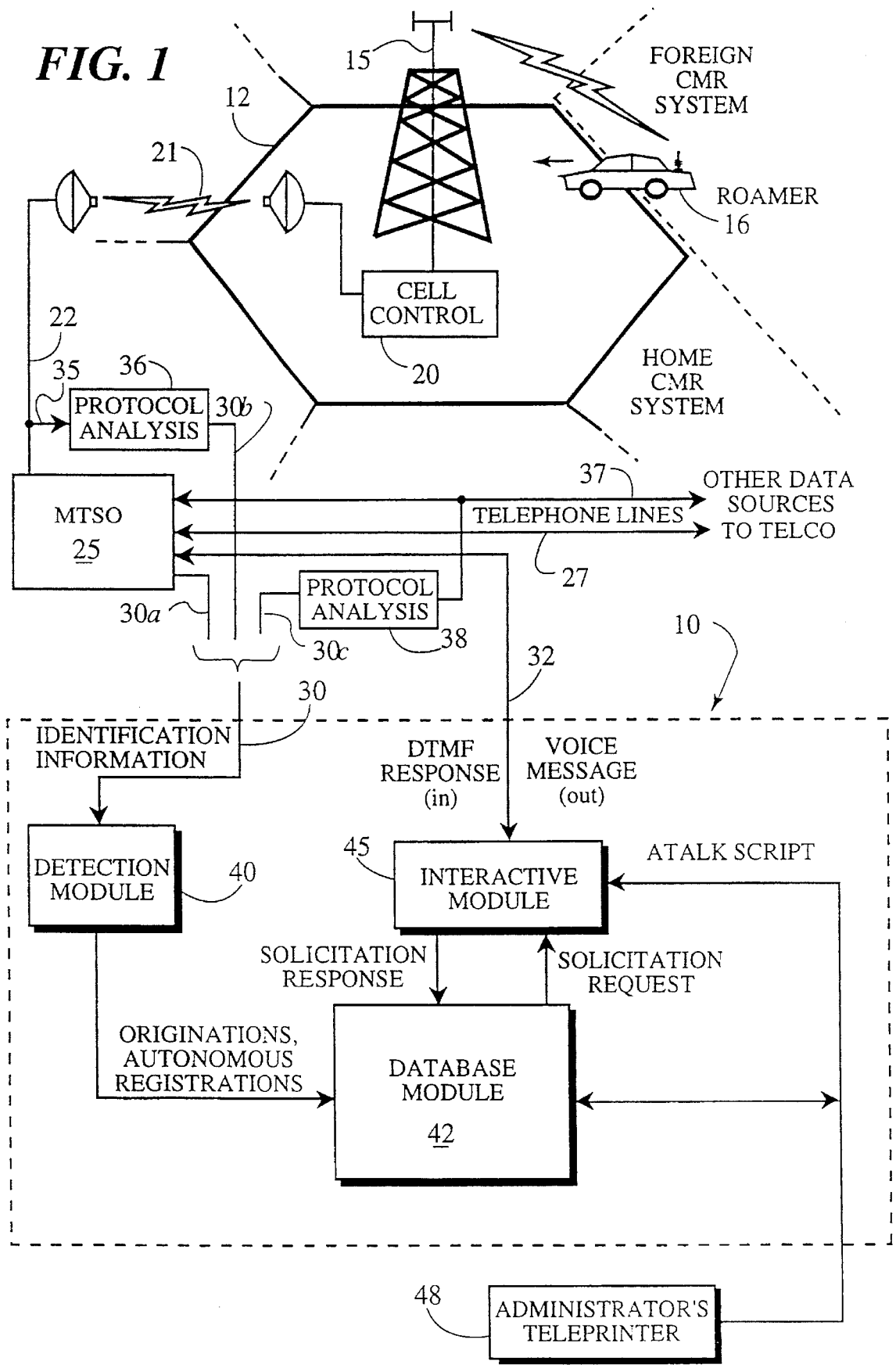
FIG. 1 is a block diagram of the preferred embodiment of an automated interactive CMR system customer class identification and contacting system constructed in accordance with the present invention.

Referring now to the drawings, in which like numerals indicate like elements throughout the various figures, FIG. 1 illustrates the preferred embodiment of an automated interactive customer class identification and contacting system 10 constructed in accordance with the present invention. A typical cellular system includes a geographic radio service area such as indicated by the cell 12, of which a plurality are typically provided in the typical operator's system. The cell 12 is served by a broadcast antenna 15. As a vehicle such as the car 16 with a cellular mobile radiotelephone enters the cell 12, and assuming that the cellular mobile radiotelephone is turned on, a communication will occur between the telephone in the car 16 and the cell control 20. Details of this communication are described in greater detail in connection with FIG. 2. Details of the communication between the telephone and the cell control 20 are not considered important to the present invention.

Data relating to the communication between the telephone and the cell 12 are transmitted either by dedicated telephone lines (not shown) or more frequently by a microwave data link 21 and cell-to-MTSO data link 22 between the cell control 20 and a Mobile Telephone Switching Office (MTSO) 25 or switch. It is well known to those skilled in the art that the conventional CMR system comprises at least one MTSO 25 coupled to an appropriate array of more or less identically equipped cell sites 12, and that the MTSO couples telephone conversations of the mobile sites to the telephone lines of the public switched telephone network through a plurality of telephone lines 27.

Figure 4:
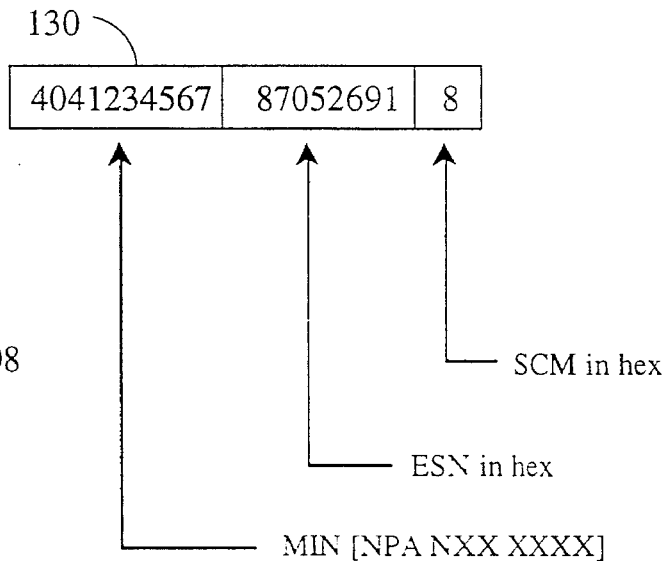
FIG. 4 is a diagram illustrating the various fields of the identification information data record provided in the preferred embodiment by the detection module to the database module upon detection of a mobile radiotelephone in the CMR, and is representative of the information passed from the cell to the MTSO whenever a cellular mobile radiotelephone originates a call or autonomously registers.

The present invention of an automated interactive customer class identification and contacting system 10 is operative to receive identification information on line 30 via several alternative means, and to respond to same in the manner described herein via at least one telephone line 32 to the MTSO 25 by providing voice message outputs from the system 10 and receiving TOUCH-TONE® responses from customers as inputs. Generally, the data provided by a call originating or autonomously registering mobile radiotelephone is in the form of a serial data stream containing identification information, as shown in FIG. 4. This identification information may be derived in several manners.

In one embodiment, the identification information is provided directly from the MTSO 25 via a serial data connection 30a. It is considered within the skill of the art to obtain a physical electrical connection to the MTSO 25 for providing this serial data stream to the system 10.

Alternatively, the identification information may be obtained via a tap 35 onto the cell/MTSO data link 22. The tap 35 is then connected to a protocol analyzer 36 so as to separate the identification information from other data occurring on the cell/MTSO data link 22, and to provide the separated identification information on line 30b.

Other methods for obtaining identification information may occur to those skilled in the art, especially after new capabilities of the cellular network are implemented. For example, EIA/TIA Interim Standard 41(IS-41) contemplates methods for cellular inter-system handoff and call delivery. IS-41 is expected to initially use the known X.25 protocol as a transport mechanism, with eventual migration to an SS7 network. The SS7 network may utilize the existing SS7 network of the telephone companies, but may also use various interconnected private SS7 networks.

The IS-41 standard allows calls to be handed off between dissimilar cellular systems, not unlike the way that calls are handed off between cells of a single system. The data that is communicated between the cellular systems is passed over the IS-41 network (initially using X.25 and later SS7), and is expected to contain information similar to that shown in FIG. 4. The present invention can easily be configured to monitor such a future IS-41 network link to discover mobiles entering its market as an alterative source of identification information.

Accordingly, FIG. 1 also shows identification information being derived from a line 37 connected to other data sources such as IS-41 SS7 and X.25 networks and provided to the MTSO 25. If required, a separate protocol analyzer 38 may be employed to separate the identification information from other data on the IS-41 line 37. The separated identification information is provided on line 30c. However, it should be understood that the line 30c may contain information that originated at the local MTSO and is destined for a remote MTSO via the IS-41 link, for cellular system hand-off. The present invention may passively monitor the identification information as in the case of the tap 35 to the cell/MTSO data link 22, but in cases where the protocol is public domain, protocol analysis might be unnecessary to create protocol conversion.

In cases wherein the identification information is not provided directly from the switch 25 and/or protocol analysis is required, it will be understood that registration (including call origination) messages will be interspersed on the cell/MTSO data link 22 along with other unrelated messages during normal operation. One method for convenient deciphering of registration (or origination) messages is to connect the tap 35 and a conventional protocol analyzer 36 to the cell/MTSO data link 22 in early AM hours, when little or no traffic is on the system. Using a known cellular telephone, allow the telephone to register and observe the message format. The same process should be followed for a call origination. Later, when other messages are intermixed on the cell/MTSO data link 22, the particular message format signature can be recognized and the relevant identification information extracted.

It should also be understood that certain manufacturers of switches 25 provide the serial data stream of call origination or autonomous registration unit identification information as an output 30a, for example, the Motorola EMX and AT&T AUTOPLEX-1000 brand switches include an RS-232 serial output that can be used for this purpose, and therefore this dedicated output may be used with switches of these types as the data input for line 30. It will of course be appreciated that identification information supplied directly from the switch 25 should contain registration messages only and require no discrimination or protocol analysis.

Figure 5:
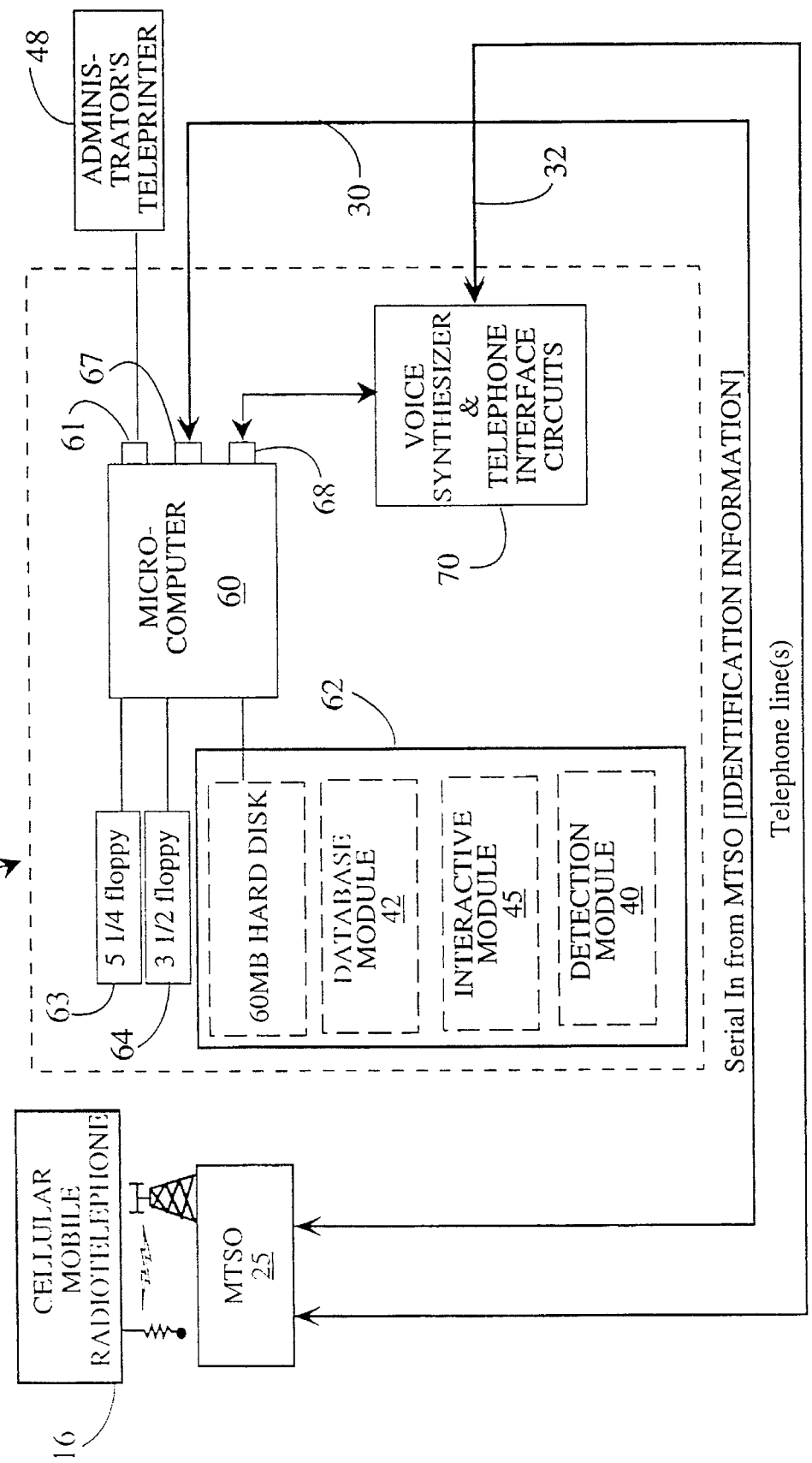
FIG. 5 is a block diagram of the hardware architecture of the preferred automated interactive CMR system customer class identification and contacting system of FIG. 1.

The preferred system 10 physically comprises a computer system or combination of computer systems which receives the identification information, generates synthesized voice messages, and processes responses from contacted telephone users. The computer system, an exemplary hardware architecture for which is shown in FIG. 5, runs a plurality of interrelated computer software or program modules 40, 42, 45 which cause computer to carry out the functions described herein. Accordingly, the system 10 comprises a detection module 40 which serves as means for monitoring the identification information provided by the registering mobile radiotelephone. The detection module 40 is responsive to the monitored identification information for detecting predetermined identifying characteristics of the registering mobile radiotelephone.

In particular, the detection module 40 determines whether the registering mobile radiotelephone in the car 16 is a home unit or a roamer. In the case of roamers, certain messages or services, to be described in more detail below, are then directed to the detected roamer. In the case of a home unit, further identification such as by type of telephone, certain portions of the mobile identification number (MIN) or telephone number [NPANXXXXX], station class mark (SCM) identifier, or electronic serial number (ESN) corresponding to particular manufacturers, and the like, allow further selective message targeting.

Information as to the characteristics of the registering unit detected by the detection module 40 is then provided to a database module 42. This information, denominated ORIGINATIONS, AUTONOMOUS REGISTRATIONS in FIG. 1, corresponds to the concurrence of a registration condition (such as a command to roamers to register or a command to home units to register) and the data provided by registering units in response to such commands. For example, in response to a command to roamers to register, only the identification information from active roaming units will occur on the line 30; home units will not respond to this command. The database module 42 is responsive to the detection of at least one selected predetermined identifying characteristic of the registering mobile radiotelephone for determining whether the unit is of a particular type for which a communication should be directed, and for recording and saving responses of the registering mobile radiotelephone to such communications. In particular, the database module 42 provides a data signal SOLICITATION REQUEST as an output, indicative that the registering unit should be contacted, and receives an input signal SOLICITATION RESPONSE indicative of any interactively provided response to a communication. The database module 42 is continuously updated to reflect the status of solicitation requests and of responses to solicitations, which are associated with the telephone numbers of the registering telephones.

An interactive module 45 is responsive to SOLICITATION REQUESTs from the database module 42, to generate synthesized a VOICE MESSAGE output which is provided on a telephone line 32 to the MTSO 25. Similarly, the interactive module 45 receives a DTMF RESPONSE signal input (typically generated by the user pressing TOUCH-TONE® keys) from a contacted cellular mobile radiotelephone during a solicitation, and provides the SOLICITATION RESPONSE data for storage in the database module 42.

The interactive module 45 contains at least one stored voice message script and means responsive to such stored voice message script for generating a synthesized voice message for provision as the VOICE MESSAGE output on the telephone line 32 to the switch 25. The stored voice message scripts are encoded in a special language described hereinbelow and denominated ATALK. ATALK scripts are loaded into the preferred system 10 from removable disk storage media under control of an administrator's teleprinter 48. The use of removable disk storage media allows the off-line generation, editing, and storage of voice message scripts, which are later loaded into the interactive module 45 for execution in response to appropriate conditions. The interactive module 45 is capable of storing a plurality of different scripts in a compacted form, each different script being specifically targeted as interactive voice message sequences and expected responses for particular different classes of detected units such as roamers or home units of a certain type, etc.

The administrator's teleprinter 48 is connected to the preferred embodiment 10 via direct connection to a serial port. Information stored in the database module 42 may therefore be extracted by the administrator's teleprinter 48 for purposes of reading error logs, generating administrative reports on system usage and statistics, administratively blocking solicitations to selected customers, and the like. In the preferred embodiment, the administrator's teleprinter 48 is a personal computer (PC).

Figure 2:
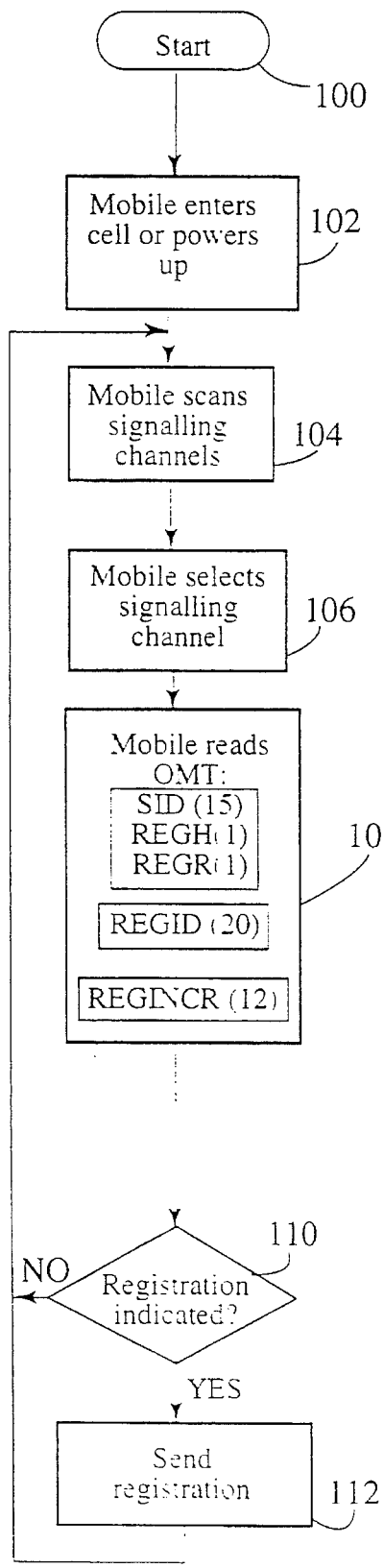
FIG. 2 is a flow chart of the process carried out within a cellular mobile radiotelephone as it initially enters a cell or powers up for the first time within a cell and registers, thereby providing its predetermined registration information.

In order to illustrate one method whereby identification information is obtained in the present invention, FIG. 2 is a flow diagram of the autonomous registration process executed by cellular mobile radiotelephones in a typical networked cellular system. This registration process alerts the switch 25 to the presence of an active mobile radiotelephone within the area of coverage of a cell of the CMR system. The process in FIG. 2 is entered at the start block 100. Step 102 occurs when the mobile is turned on within the area of coverage of a cell 12, or when it initially enters the area of coverage of a cell 12 from a region exterior to the CMR system, such as shown in FIG. 1. At step 104, the signalling channels, typically a group of twenty-one channels, are scanned. Next at step 106, the mobile selects the signalling channel in the group which has the strongest signal strength. The mobile then tunes to the selected signalling channel.

At step 108, the mobile reads the overhead message train (OMT) on the selected signalling channel. The overhead words in the OMT inform the mobile how the CMR system is configured and how the mobile is to use the system. The OMT is transmitted on signalling channels throughout the cellular system service area, nominally once per second, and includes a system identification (SID) field of 15 bits, a "register home" (REGH) command bit, a "register roamers" (REGR) command bit, plus several other data fields. A registration identification (REGID) field of 20 bits and a registration increment (REGINCR) field of 12 bits are also relevant to the mobile registration process, but are not utilized in the present invention.

After reading in the OMT, the mobile determines at decision block 110 whether registration is indicated. Registration is the process by which a mobile unit becomes listed in the switch 25 as being present and active in the service area of the cellular system. Mobile registration procedures are controlled by the provisions of the EIA/TIA-533 referenced hereinabove.

Figure 3:
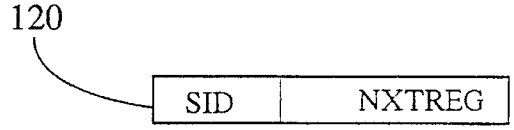
FIG. 3 is a diagram of various fields of data stored within the parameter memory of a typical cellular mobile radiotelephone.

Registration is enabled or disabled selectively and individually for each class of mobiles, for example, home or roamer units, by means of the control bits REGH and REGR in the OMT. As described above, the OMT also contains the identification number of the current cellular system (SID) by means of which the mobile determines whether it is present at "home" or whether it is a "roamer". Thus, and referring now to FIG. 3, each mobile contains, in its internal parameter memory 120, a data entry denominated SID indicating its home cellular system, along with a value denominated NXTREG used to determine when the mobile is scheduled to reregister. By comparing the SID stored in memory to the SID received in the OMT, the mobile unit determines whether it is at home or a roamer, and whether it needs to register as a home unit, register as a roamer, or whether it should reregister.

Cellular system access for registration purposes only occurs in response to an indication of registration included in the OMT. A particular mobile will respond to a specific registration command in the following conditions are satisfied: (1) registration is enabled for its class, and (2) either (a) the mobile is not currently registered in the system (that is, the SID is not currently contained in the mobile's memory 120), or (b) the value of the REGID data in the OMT exceeds the value of the NXTREG variable associate with the SID in the mobile's registration memory. Although no pertinent to the present invention, each time the mobile registers it updates the corresponding NXTREG value by adding the last received value of REGINCR to the last received value of REGID.

If the foregoing conditions are satisfied, the mobile responds by transmitting a data packet or record 130 comprising at least some of the identification information shown in FIG. 4. This data record is transmitted over the seized control channel and received by the cell control circuitry 20 (FIG. 1). At the cell control 20, data is transmitted via the cell/MTSO data link 22 to the MTSO 25 that contains, in part, the information within the data record 130.

Referring now to FIG. 4, the registration information provided on the cell/MTSO data link 22 typically comprises a data record 130 consisting of various data fields in an X.25 or ADCCP format. The field contents typically comprise the Mobile Identification Number (MIN) of the mobile in [NPANXXXXXX] form, the Mobile Identification Number (MIN) in hex, the electronic serial number (ESN) in hex, the station class mark (SCM) in hex, and the number of the cell in which the registering unit was detected. This data is typically provided as a serial record at 9600 baud, in accordance with EIA specifications.

It should be understood at this juncture that the identification information provided on the line 30 shown in FIG. 1 may be in different forms and obtained in different manners. The information may be in the form of a data record 130 in X.25 or ADCCP format, or the information may be in ASCII or other data communications format. The formats may vary, depending upon whether the identification information is derived by analyzing the protocol on the ceil/MTSO data link 22, or whether the MTSO is configured to provide the identification information. In either case, the identification information is received on line 30 from a source external to the preferred embodiment of the present invention, and typically comprises information in the data record 130.

From the foregoing, it will be appreciated that identification information comprising a data record 130 associated with a registering cellular mobile radiotelephone is automatically provided from the telephone 16 in FIG. 1 to the cell control 20, and thence via the the microwave data link 21 and the cell/MTSO data link 22 to the MTSO 25. Moreover, it will be further appreciated that in the case of roamers, identification information for this class of cellular mobile radiotelephone is only provided at such times as the OMT has the REGR bit set. In like fashion, home units only provide their data at such time as the OMT has the REGH bit set. It will therefore be understood that by monitoring or capturing the contents of the registration information data record 130 at the MTSO 25, and by determining whether the REGH or REGR bits are set, one can determine whether a given registering cellular mobile radiotelephone is a home unit or roamer.

In addition to determining whether a registering mobile radiotelephone is a home unit or a roamer, the present invention is operative to detect further characteristics of registering mobiles. Thus, further aspects of the identification information data record 130 are utilized in the present invention. The MIN typically contains information unique to the CMR system operator, for example, the first three digits of the MIN (i.e., "NPA") typically correspond to area code, and the next three digits ("NXX") typically correspond to geographic location within the area code; the final four digits ("XXXX") usually carry no differentiating significance. Similarly, the ESN is unique to each mobile cellular radiotelephone, and comprises a format that allows differentiation as to manufacturer, and in some cases the model number, date of manufacture, and the like. Similarly, the SCM indicates a type of cellular mobile radiotelephone such as portable, transportable, automobile, expanded channel capability, etc.

Any and/or all of the foregoing various identification factors comprise a predetermined identifying characteristic that may be used to determine a "class" of the registering cellular mobile radiotelephone, and form the basis for generating a class-targeted solicitation or information provision directed only to members of that class, in the manner described herein. As specific examples, it is expressly contemplated that the predetermined identifying characteristic may correspond to a roamer unit, and the class targeted communication may comprise information about a service provided for roamers in the CMR system. The predetermined identifying characteristic may correspond to a local or home unit of the CMR system, and the class targeted communication may comprises information about a service for owners of local or home units in the CMR system. The predetermined identifying characteristic may correspond to at least a portion of the MEN, and that portion of the MEN may be employed to determine whether the registering mobile radiotelephone is in a predetermined geographic class of customers of the CMR system. In this case, the class targeted communication may comprise information related to a service offered to the predetermined geographic class of customers of the CMR system. The predetermined identifying characteristic may correspond to the SCM identifier associated with the mobile radiotelephone, to determine whether the registering mobile radiotelephone is of a particular type of mobile radiotelephone, and the class targeted communication may comprise information related to a service provided by the operator of the CMR system to owners of the particular type of mobile radiotelephone, for example a trade-in offer for owners of a particular type of telephone. The predetermined identifying characteristic may correspond to at least a portion of the ESN associated with the mobile radiotelephone, for example to determine whether the registering mobile is of a type made by a particular manufacturer, and the class targeted communication may comprise information about a service provided for owners of mobile radiotelephones made by this particular manufacturer.

As a final example, without limitation, the predetermined identifying characteristic may identify the registering mobile radiotelephone as a unit which has been sold preconfigured to the system identification (SID) of the operator of the CMR system. This situation might occur where the purchaser of a new telephone, prior to "officially" subscribing to cellular telephone service with the CMR system operator, turns on his or her new telephone within the area of coverage of a cell. The telephone, being a home unit, will respond to commands in the OMT by transmitting its identification information, and the SID of the telephone will indicate that the telephone belongs in this particular CMR system. But since the particular telephone's MIN has not been associated with a particular customer's name and address for billing purposes, the telephone will not be listed in the CMR system database at the MTSO as an authorized and usable telephone. In this case, the "class" of telephones comprises unsubscribed new telephones, that is, telephones having an MIN without an associated customer name and address. The class targeted communication in this case might comprise a voice message related to the provision of services offered by the operator of the CMR system to a newly subscribing customer. It will therefore be appreciated that the present invention may be used to detect the occurrence of new telephones in the CMR system, provide information about cellular service, automatically solicit subscription information (such as name, address, credit card number, and the like), receive subscription information from the telephone's owner provided via the TOUCH-TONE® keypad, and thereby automatically and interactively register the new customer into the system and enable calls to be made and received.

Referring now to FIG. 5, the hardware configuration of the preferred automated customer class identification and contacting system 10 comprises a rack mounted, industrial grade IBM Personal Computer (PC) or compatible microcomputer 60, operating the UNIX System V operating system, as the central controller. The microcomputer 60 is configured without a CRT or keyboard. Operator interaction is accomplished with a 1200 baud RS-232-C serial ASCII port 61 in lieu of a permanently installed CRT or keyboard. The serial port 61 is employed to connect to an administrator's teleprinter 48 for maintenance, configuration, and trouble-shooting. Preferably, the physical orientation of the microcomputer 60 is vertical so that removable components can be accessed from the equipment front. The microcomputer 60 preferably also includes a fixed mass storage device such as a 60 megabyte (MB) hard disk 62. While the data storage capacity of the hard disk 62 is not critical, it is believed that the storage capacity should be at least 10 megabytes more than that consumed by the operating system, utilities, database, diagnostics, and applications programs. Optionally, a 360 kilobyte (KB) 5¼ inch floppy drive 63 and/or a 1.4 MB 3½ floppy drive 64 are also provided for configuring and initializing the system.

The preferred microcomputer 60 further includes two additional asynchronous serial ports 67, 68 for input and output. The serial port 67 is provided for receiving a serial data stream input from the MTSO 25 or other source of identification information from the switch. The serial port 68 is provided to a voice synthesizer and telephone interface circuit 70, which is responsible for providing synthesized voice signals over the telephone line 32 back to the MTSO 25. The voice synthesizer and telephone interface circuit 70 is also operative for receiving DTMF signals from the telephone line 32, decoding the same, and providing decoded responses to voice solicitations back to the microcomputer 60. The preferred voice synthesizer and telephone interface circuit 70 comprises a DIALOG/41B multi-line voice communications circuit board manufactured by Dialogic Corporation, 300 Littleton Road, Parsippany, N.J. 07054. Details of the preferred circuit board 70 are provided in the literature supplied by the manufacturer.

As shown generally in connection with FIG. 1, the preferred automated customer class identification and contacting system 10 comprises three functional software modules. These software modules run on the microcomputer 60 and carry out the method of automatically detecting the presence of predetermined classes of mobile radiotelephones within the cellular network, such as roamers, and of automatically and interactively communicating with a registering mobile radiotelephone within such classes. The detection module 40 detects cellular telephone call originations and/or autonomous registrations received on line 30 from the switch 25 or other source, and sends the mobile telephone number (MIN), electronic serial number (ESN), and station class mark (SCM) information to the database module 42. The database module 42 indexes on each MIN received from the detection module 40 and searches to find any prestored information in the database associated with a given MIN. In the case of roamers and other specifically targeted classes of telephones to be contacted, if the database search indicates that the registering mobile has never been solicited, or been neither detected nor solicited within the last n days, then the MIN is passed to the interactive module 45 in the form of a SOLICITATION REQUEST.

When the interactive module 45 receives a SOLICITATION REQUEST, it carries out a solicitation process. The database module 42 and interactive module 45 maintain an acknowledge/not acknowledge protocol. In other words, the interactive module 45 informs the database module 42, in the form of updated status information, of the success or failure of a solicitation request, which is then recorded as status information in the database associated with the MIN. In the preferred embodiment, this is accomplished via the Inter-Process Communication (IPC) provided as a part of the UNIX operating system. Once a mobile has been detected, and its MIN entered into the database, the database module 42 maintains its database record until manually deleted by the system administrator. One important feature of the database records is a flag or status bit that forces solicitation to be ignored or blocked for that particular mobile. This flag can be set by the customer in response to an inquiry whether the customer wishes to block further solicitations, via enacting a specific TOUCH-TONE® key, or can be set manually by the system administrator.

When the interactive module 45 receives a SOLICITATION REQUEST, it is operative to place a telephone call to the MIN passed as a part of the data from the database module 42. If the call cannot be completed, the interactive module will schedule a predetermined number x more attempts, spaced at predetermined time intervals t. The values for the number of attempts x and time intervals t are operator adjustable parameters. In the preferred embodiment, the default value of x is three and the default of the predetermined time interval t between attempts is five minutes.

When the interactive module 45 successfully connects to the dialed telephone number, it immediately speaks a series of preset messages in the form of synthesized voice, which are defined in terms of ATALK scripts that are alterable by the system administrator. The interactive module 45 then awaits customer DTMF input, as defined in the script, and then appropriate action is taken in response thereto. All spoken messages, DTMF detection, and responses, are usually controlled by the ATALK script language. As described in more detail below, the system administrator is able to record and identify spoken words and phrases and reference these within an editable text file that contains the operational script in ATALK that is converted into synthesized voice messages.

Figure 6:
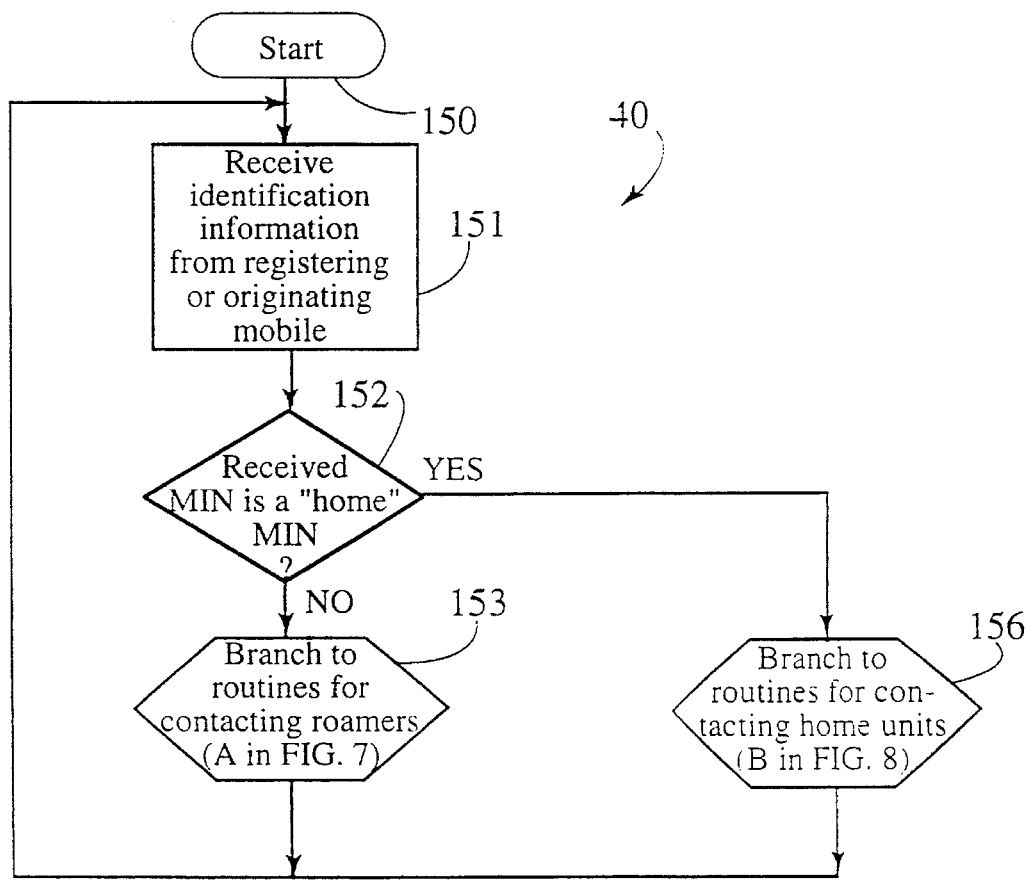
FIG. 6 is flow chart of the detection module software of the preferred automated interactive CMR system customer class identification and contacting system of FIG. 1.
Figure 7:
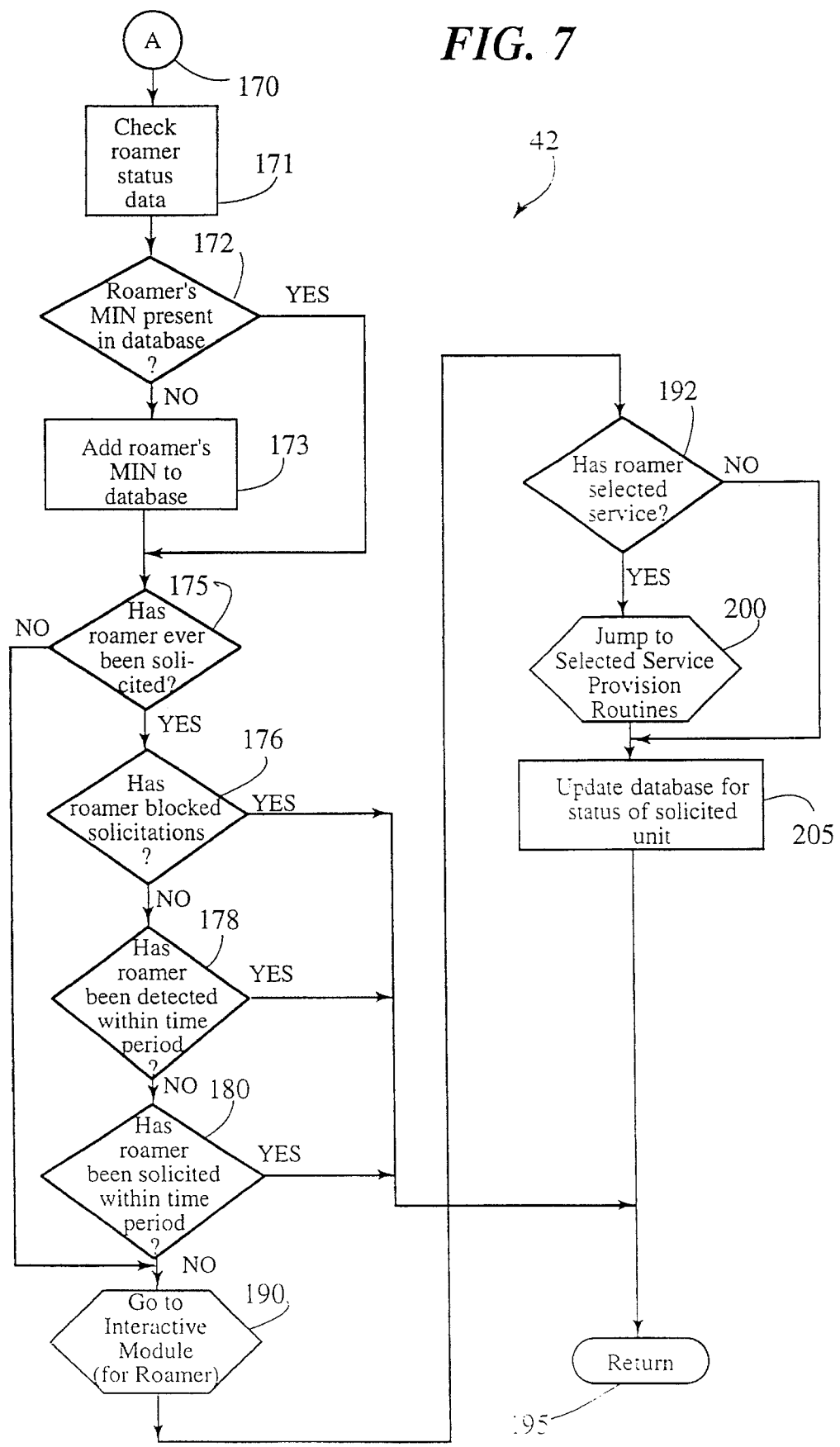
FIG. 7 is a flow chart of the database module software of the preferred automated interactive CMR system customer class identification and contacting system of FIG. 1, specifically directed to roamers.
Figure 8:
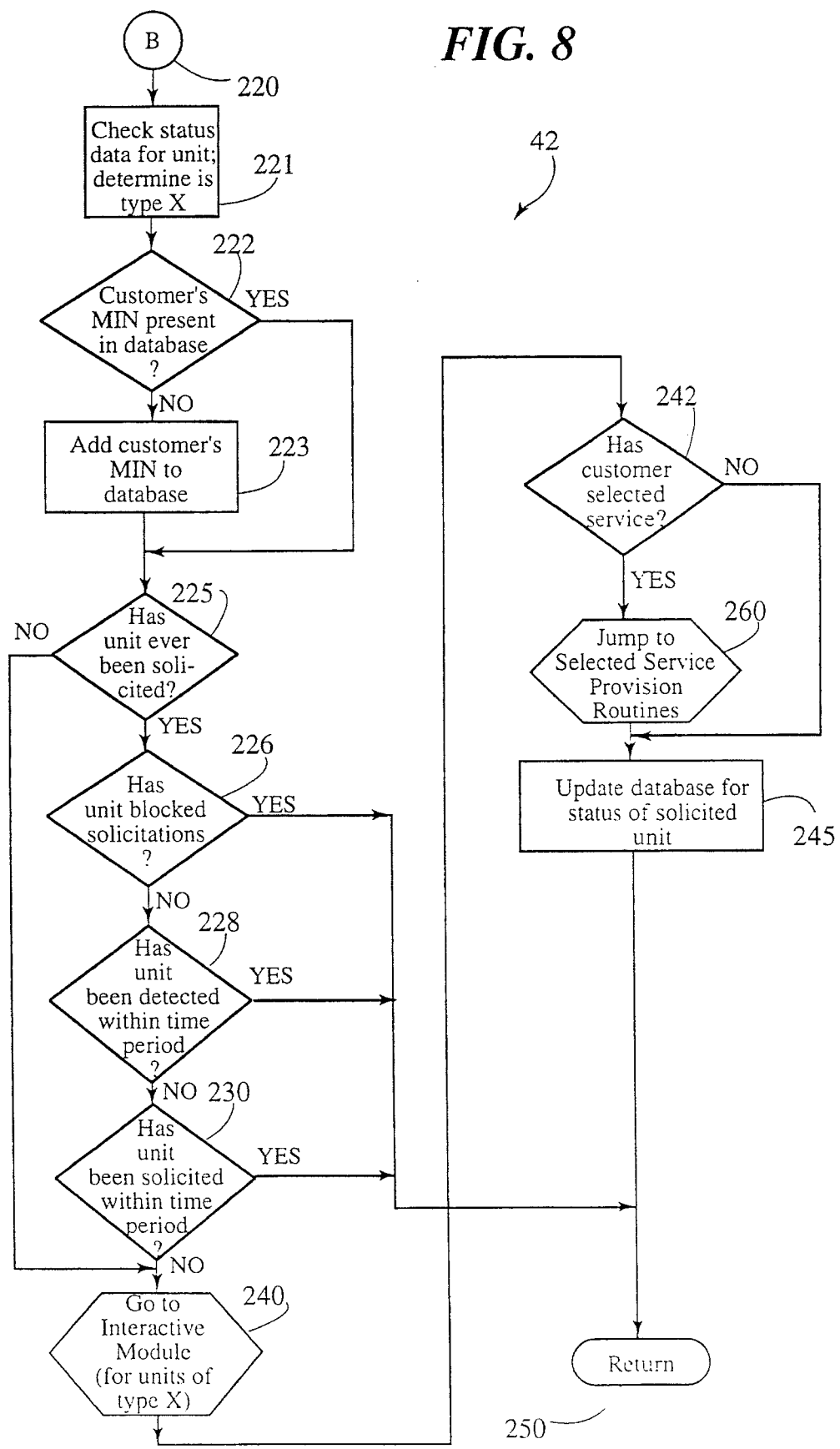
FIG. 8 is a flow chart of the database module software of the preferred automated interactive CMR system customer class identification and contacting system of FIG. 1, specifically directed to customers of a predetermined but general class or type "X".

With the foregoing general operation in mind, and referring now to FIG. 6, the detection module 40 starts at the start block 150. The detection module 40 examines each data packet received from the MTSO 25 or other identification information source, and determines whether the data corresponds to a call origination or a registering mobile, or is unrelated to mobile registration. At step 151, identification information is received from an information source such as the MTSO 25. At decision block 152, if the received MIN is not a home MIN, then the detection module 45 takes the "NO" branch to block 153 and executes routines for contacting roamers; a roamer has been detected. The program branches to block A (FIG. 7). If the received MIN is a home MIN, the "YES" branch of decision block 152 is taken to 156, and routines for contacting home units are executed; a home unit has just registered with the switch. The program branches to block B (FIG. 8). It is typically during the enablement of this program branch that class identification according to NPANXX, SCM, or ESN are carded out, since in general the CMR system operator may not wish to involve roamers in product solicitation, surveys, etc., for non-subscribing customers. If a registering mobile, home or roamer, has been detected, identification information of the registering mobile comprising MIN, NPANXXXXXX, ESN, and SCM are provided from the detection module 40 to the database module 42.

It should be understood at this juncture that the detection function of the detection module 40 may reside either as software within the MTSO 25, or as an external microprocessor, or as a separate program module running on the microcomputer 60. The preferred embodiment contemplates the latter. Regardless of its physical location, the function is the same, which is to identify mobiles currently operating in the CMR system, and supply their identity to the database module 42.

In the event that identification information is to be provided to the database module 42 from the MTSO 25 by a detection function carried out in the switch, the data is preferably provided via a standard 25 position DCE (female) D-sub connector, utilizing the RS-232-C standard, ASCII format, at 9600 baud, 8 data bits, no parity. In this case, the detection module 40 is merely operative to request a record (for a roamer or for a home unit) by sending an ASCII ENQ character (hex 05) to the port. If no record is available, the detection function at the switch 25 should immediately rerun an ASCII NAK character (hex 15). If a record is available, the detection function should immediately transmit the entire record. Preferably, the detection module 40 is capable of buffering up to 500 records. If autonomous registrations exceed the buffering capacity of the detection function to report or handle them, the overflow may be discarded. Notification of the overflow may be noted in a subsequent transmitted record.

If the detection function or module 40 is to reside external of the cellular switch 25, the following procedure may be performed to obtain the format of the identification information: During an extremely idle traffic time, such as early AM, connect a protocol analyzer to the cell to MTSO data link 22. These are typically X.25 or ADCCP protocols. Make a series of cellular calls using a known telephone and collect the data messages transmitted between the cell and MTSO. Autonomous registration messages may also be captured. During such an idle traffic period, the test calls should represent almost the only data traffic, and their content can be easily determined, since the called and calling (MIN) number as well as Electronic Serial Number (ESN) and Station Class Mark (SCM) will be known. Once the format of the desired messages is determined, program a microprocessor to transmit the data elements as described above.

Turning now to FIG. 7, the entry point A of the database module 42 begins at 170. FIG. 7 illustrates the steps taken to solicit roamers in the database module 42. The first step taken at 171 is to check status data associated with the detected roamer's MIN. At decision block 172, the database is checked to determine whether the roamer's MIN is present in the database. If not, at step 173 the roamer's MIN is added to the database, and a new database record for this particular MIN is added to the database.

If the roamer's MIN is already present in the database at 172, or after leaving step 173, the inquiry is made at 175 whether the roamer has ever been solicited. If the roamer has never been solicited, then the "NO" branch is taken to step 190, and subroutines for soliciting the roamer are called and run, which include the generation of an initial voice solicitation message. These subroutines comprise portions of the interactive module 45 in FIG. 9.

Returning to step 175, if the roamer has been solicited before, the "YES" branch is taken to decision block 176, where the inquiry is made whether the roger has blocked solicitations. If so, the "YES" branch is taken to return block 195, and this portion of the program exits. If the roamer has not blocked solicitations, the "NO" branch is taken to decision block 178.

At 178, the inquiry is made whether the roamer has been detected within a predetermined time period y. The predetermined time period y is an administrator adjustable parameter. If the roamer has been recently detected, for example, within the past few minute or hours, a solicitation request will have already been generated, and there is no need for an additional solicitation at this time. On the other hand, if the roamer has not been detected for a substantial period of time, say several days, it may be that the roamer left the service area, reentered the service area, and may now desire to select roaming services. If the roamer has been recently detected, a repeat solicitation is avoided by taking the "YES" branch from 178 to the return block 195.

If the roamer has not been detected within the time period y, the "NO" branch from 178 is taken to decision block 180, where the inquiry is made whether the roamer has been solicited within a recent time period z. Again, the predetermined time period z is a selectable administrative parameter. The value of z is selected to be large enough to avoid annoying repeated solicitations, say on the order of several days or weeks.

At 180, if the roamer has been recently solicited (as opposed to detected), then the "YES" branch is taken to the return block 195. If the roamer has not been solicited recently, then the "NO" branch is taken to 190, and the interactive module 45 for roamer solicitation is called and executed. An exemplary roamer solicit subroutine is described in greater detail in connection with FIG. 9. These routines involve calling the roamer, delivering a synthesized voice message targeted at roamers, and receiving any DTMF responses to any solicitations.

After the roamer solicit subroutines at 190, and the roamer has been afforded an opportunity to respond to the solicitation, the program reaches decision block 192. At 192, the inquiry is made whether the roamer has selected any of the services offered or responded to a survey question. If the roamer has selected the CMR system operator's offerings, the "YES" branch is taken to subroutines at 200, where selected service provision routines are called. As a specific example, assuming that the roamer has elected to receive roaming services from the CMR system operator, the routines 200 create an order record which can be sent the system operator, who can enable the MTSO to provide the selected service whenever the roamer originates a call or a call is provided from an external source to be connected to the roamer.

After the return of any service provision routines in 200, or if the roamer has not selected to accept roaming service at 195 and the "NO" branch is taken, the program reaches step 205. At 205, the database maintained by the database module 42 is updated to reflect the status of the solicited unit. As specific examples, appropriate flags or data values are set that the roamer has now been solicited once (for decision block 175), whether the roamer has blocked further solicitations (for inquiry block 176), the time of last detection (for inquiry block 178), and the time of last solicitation (for inquiry block 180). These flags and data values are associated with the MIN in the database. When the program reenters the database module 42 upon detection of this roamer again, appropriate values will be present to block further solicitations, prevent annoying solicitations, and the like.

The database module 42 is also preferably operative to accumulate statistics of operation for reporting to the administrator, for example the quantity of mobiles detected by the detection module, the quantity of mobiles detected that are flagged to be ignored, the quantity of mobiles successfully solicited, the quantity of mobiles unsuccessfully solicited, the quantity of mobiles not solicited due to system problems, and the quantity of eligible mobiles not solicited due to load.

Turning now to FIG. 8, next will be described the customer solicit module of the database module 42. The steps shown in FIG. 8 are taken in response to detection of a home unit by the detection module 40. Starting at the entry point B 220, the first step taken at 221 is to check the status data of the registering unit, i.e., whether the registering unit is of a particular class or type "X". For example, the type X can be the NPA of the MIN, the first three digits of the NXXXXXX of the MIN, the SCM, the ESN, a new MIN for unsubscribed unit, etc. This checking is performed by looking at the identification information provided from the detection module 40, indexing on the MIN to determine whether there is a record entry corresponding to this MIN in the database. These parameters all allow differentiation between "classes" of units.

It will be understood that the steps of FIG. 8 are carried out for each class of unit for which a class targeted communication is to be directed. As a specific example, it may be that only hand-carried portable units made by a particular manufacturer may be targeted for a solicitation when, for example, the CMR system operator is promoting a special accessory product or trade-in policy.

After determining the type of telephone, the decision block 222 is entered. At 222, it is determined whether the customer's MIN is present in the database. If so, the "YES" branch is taken. If not, the "NO" branch is taken to 223, and the customer's MIN is added to the database. After adding the customer's MIN to the database or if it is already present, the program reaches 225.

At 225, the inquiry is made whether the unit has ever been solicited. If not, the "NO" branch is taken to step 240, and the interactive module for units of type "X" is called and executed. If the unit has been solicited before, the "YES" branch is taken from 225, and the inquiry is made at decision block 226 whether the customer has blocked further solicitations. If solicitations have been blocked, the "YES" branch is taken to the return block 250 and the program exits.

If the customer has not blocked solicitations, then the "NO" branch from decision block 226 is followed to decision block 228. At 228, the inquiry is made whether the customer has been detected within a predetermined time period y. This time period y operates in the same manner as the predetermined time period y in FIG. 7. If the customer has been recently detected, then the "YES" branch is taken from 228 to the return block 250. If the customer has not been detected with the predetermined time period y, the "NO" branch is taken to decision block 230.

At 230, the inquiry is made whether the customer has been solicited within a different predetermined time period z. This predetermined time period z operates in the same manner as the predetermined time period z in FIG. 7. If the customer has been recently solicited, then in order to prevent annoying repetitive solicitations the "YES" branch is taken to the rerun block 250.

If on the other hand the customer has not been recently solicited, the "NO" branch from 230 is taken to 240, where interactive module 45 for units of type "X" is called, and the appropriate voice message scripts targeted to this particular class of customers of class "X", is called and executed.

Upon return from the interactive module 45, after step 240, the interactive module will pass parameters to the database module 42 indicative of the responses of the customer to the solicitation. This data is associated with the customer's MIN in the database. Thus, at decision block 242 the inquiry is made, based on the data values passed to the database module, whether the customer has selected the offered service, responded to the survey, etc. If the customer has selected service, then the "YES" branch is taken from 242, and at 260 service provision subroutines for the selected service are called and executed. For example, these subroutines may be operative to generate orders to the system administrator or to a separate order processing system to begin provision of the selected service for the customer.

After return from the selected service provision subroutines at 260, or if the "NO" branch is taken from 242 since the customer has elected to reject the service offering, then at block 245 the database is updated to reflect the status the solicited unit, in a manner similar to that described in connection with FIG. 7. The program then returns at block 250.

Figure 9:
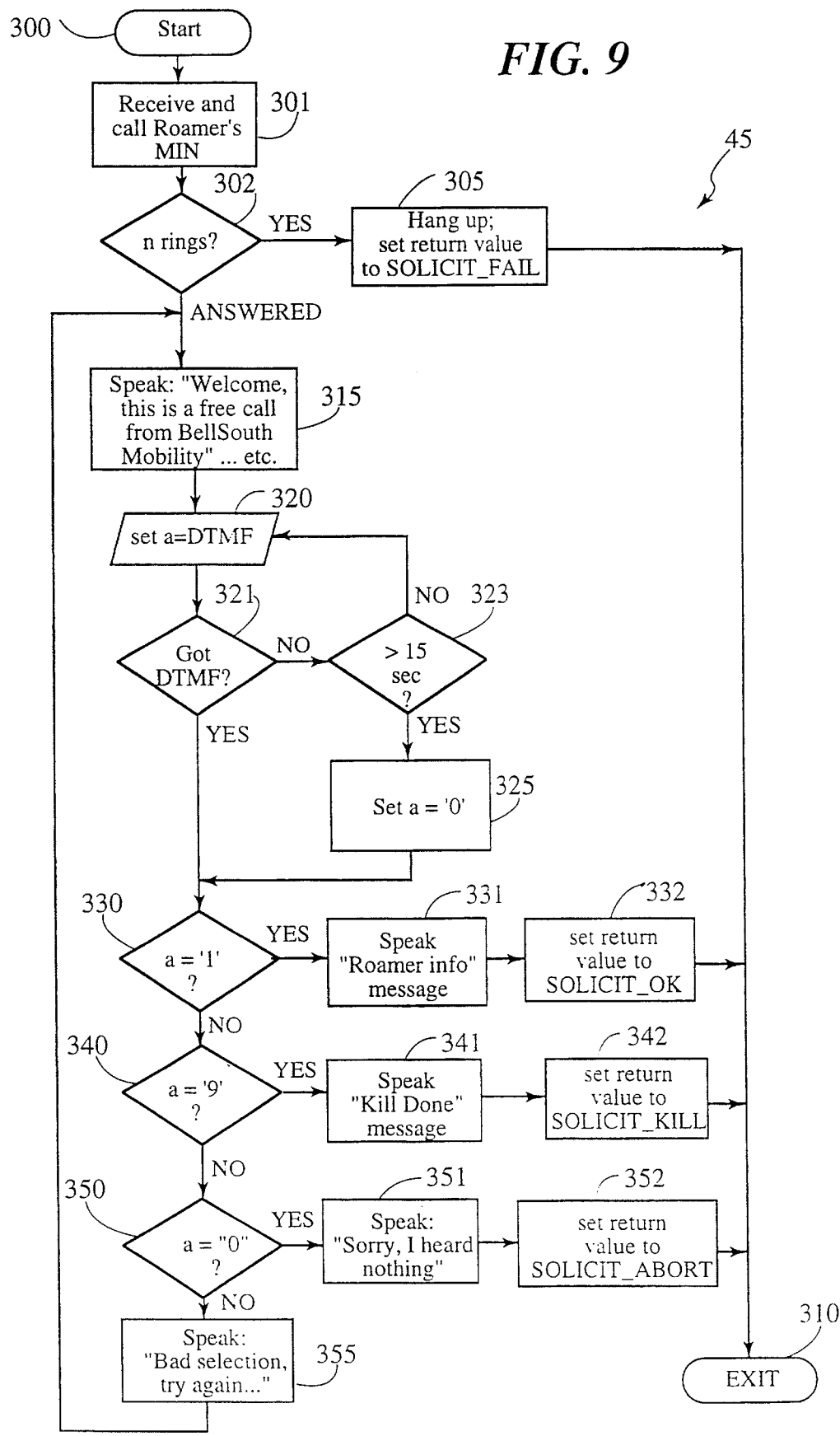
FIG. 9 is a flow chart of a typical interactive module software of the preferred automated interactive CMR system customer class identification and contacting system of FIG. 1, specifically illustrating exemplary steps for contacting a roamer and receiving responses from the roamer.

FIG. 9 illustrates the steps taken for an exemplary interactive module 45. Since one of the specific purposes of the present invention is to contact roamers, the steps illustrated in FIG. 9 are taken by the interactive module 45 in response to detection of a roamer. Therefore, the steps shown in FIG. 9 are those taken at step 190 shown in FIG. 7.

Prior to describing the steps taken in FIG. 9, it should be understood that the mechanism for generating synthesized voice messages and for DTMF detection and response comprises control scripts or programs usually written in a script language denominated ATALK. However, it will be appreciated that other computer languages are also suitable for carrying out the steps illustrated. In the disclosed embodiment, ATALK scripts form the basic control commands for the microcomputer 60, which are provided or downloaded by the system administrator to form customized class targeted communications. The ATALK scripts are prepared in a computer system exterior to the microcomputer 60 and downloaded as executable scripts. The scripts provide the ability to record and identify synthesized spoken words and phrases and reference these within an editable script text file, which is editable by the external machine. The ATALK scripts are capable of being created on a typical DOS machine, and then downloaded via serial ports or removable media to the microcomputer 60. Therefore, the preferred embodiment includes an ATALK script interpreter. Further discussion of the ATALK script is provided below.

Returning to FIG. 9, it is assumed at the start block 300 that the subroutines 190 for roamers in FIG. 7 has been called due to the detection of a roamer within the cellular system. Thus, the first step taken at step 301 is to call the roamer by placing a call to the roamer's MIN, which has been passed to the interactive module 45. Thus, the roamer's telephone will begin tinging, since it is known that the roamer's telephone is powered up and within the area of coverage of the cellular system. At decision block 302, the program loops for a predetermined number of n rings or awaits an answer. If the predetermined number of n rings is reached, then the "YES" branch from 302 is taken to block 305 and the connection is broken by hanging up; the roamer has not answered.

At 305, the database is updated to reflect that the solicitation was unsuccessful. In the preferred embodiment, a status flag SOLICIT_FAIL is set in the database associated with the roamer's MIN to indicate that there was an attempt to contact the roamer but that the attempt failed. In addition, information pertaining to the time of detection and last attempt at solicitation are recorded in the database associated with the MIN. Then, the program branches to the exit block 310.

If the telephone is answered, then the "ANSWERED" branch from 302 is taken to block 315. At this step, a synthesized voice message is generated, for example, "Welcome, this is a free call from BellSouth Mobility . . . etc." A particular additional synthesized message for roamers will likely include words to the effect of: "If you would like information about roaming services from BellSouth Mobility, please press '1', if you would like to block further solicitations, please press '9', etc."

At block 320, a variable a is established to receive the DTMF value received from the telephone customer as a result of the pressing of a TOUCH-TONE® button. At decision block 321, a loop is entered to determine whether the user has pressed a button to provide a response. If a does not contain a value, the "NO" branch is taken from 321 to decision block 323, which involves a 15 second timer. As long as 15 seconds have not elapsed, the program follows the "NO" branch from block 323 back to block 320, waiting for a DTMF input. If the 15 second timer elapses, the "YES" branch is taken from block 323, the value of a is set to '0' at block 325, and the program branches to decision block 330.

Decision block 330 is entered either if a is set to '0' due to the expiration of the timer from block 325, or when the roamer provides an input and a contains a value, from the "YES" branch of decision block 321. Thus, the steps following decision block 330 are intended to decipher the DTMF value and take appropriate action. At decision block 330, if a is '1', the "YES" branch is taken to block 331, and a predetermined synthesized voice message of information about roaming services is provided. This indicated as a "Roamer info" message. From block 331, a return value is set at 332 to SOLICIT_OK, indicative that further and more detailed messages may be provided, and the program exits at 310. This indicates that the roamer has received the initial solicitation message and responded by pressing a '1' signalling a desire to receive further messages.

If the "NO" branch is taken from decision block 330 to decision block 340, if a equals '9', the "YES" branch is taken to block 341. If the mobile telephone user presses a '9', it is an indication that he or she does not desire any further solicitations. In the case, a predetermined synthesized "Kill Done" voice message is spoken at 341, to inform the roamer that further solicitations will not occur. Then at step 342, a return value is set to SOLICIT_KILL, which is a flag that indicates that further solicitations are to be blocked. The program exits at 310.

Decision block 350 is reached if a equals '0', which occurs if the roamer has not pressed a TOUCH-TONE® key within the timer value of 15 seconds or has accidentally hit the '0' button. If a equals '0', the "YES" branch from decision block 350 is taken to block 351, and a synthesized voice message is generated to advise the roamer that a response was not heard, for example, "Sorry, I heard nothing, please press a button". The return value is set at block 352 that the solicitation was not completed or was aborted due to lack of a response with SOLICIT_ABORT flag, and the program exits at step 310.

If none of the predetermined acceptable DTMF values of '1', '9', or '0' have been occurred, the "NO" branch is taken from decision block 350, and a predetermined synthesized voice message indicative of an improper selection is generated, for example, "Bad selection, please press another button." From the block 355, the program returns to block 315 and the initial message providing the options to the roamer are spoken.

As discussed above, when the interactive module 45 successfully connects to the dialed telephone number, it immediately speaks a series of preset messages, which are defined and alterable by the system administrator. The interactive module then waits for customer DTMF input, as defined by the script language, to which it takes appropriate action. All spoken messages, DTMF detection and response, etc. are controlled by the ATALK script language in the disclosed embodiment. ATALK is computer language created by the inventor and used to describe synthesized voice and DTMF tone interaction. ATALK scripts are interpreted by the interactive module 45. The scripts provide the means for identifying spoken words and phrases, in editable script text file. Speech phrases are digitized using software supplied by the vendor of the voice synthesizer and telephone interface circuit 70. An ATALK script may created on almost any computer and downloaded to the interactive module 45. To accommodate this capability, the preferred ATALK interpreter ignores all control characters except the new-line character, which is the line terminator. This is necessary since DOS usually inserts carriage return and control-Z characters into its files.

Once a script exits, or the telephone connection is lost, the interactive module 45 posts the result value into a response queue. The queue can store up to 500 structures that contain the result value, job number and a time stamp. The responses are kept in the queue until either the database module 42 accepts it or the queue entry is over 'n' seconds old, where 'n' is an operator adjustable parameter. The database module 42 and interactive module 45 maintain an ACK/NAK acknowledgement protocol. In other words, the interactive module 45 informs the database module 42 of the success or failure of the solicitation request, which is indicated by the response value, with the signals SOLICITATION REQUEST and SOLICITATION RESPONSE.

In its native form, the ATALK language consists of numbered single line command statements, similar to the BASIC language. Each statement contains a line number between 0 and 4,095, a one letter command, and optional additional argument elements. The first statement executed is always statement 1. Statement 0 is used as an addressing error statement. If the native source contains no 0 statement, the command "X 255" is automatically inserted upon execution. The ATALK language ignores case, thus "T" is the same as "t", however, for readability, it is preferred to use upper case letters for commands and lower case for variables.

For the actual creation of an ATALK script, the native form need not be created. Instead, a more human readable form can be created, and then converted to native form with a preprocessor. In this form, no line numbers are required.

The preferred scripts include labels. A label is a name that marks a location within the script that may be referred to by jump commands. A label must be on a line by itself, and be terminated with a ':' (colon) character. Labels comprise alphabetic characters, digits, and the underscore '_' character. The first character must not be a digit. It is recommended that all labels start with "L" in order to avoid possible collisions with tags defined with a define( ) command. For example, the following label format is recommended: _L_Start:

The preferred ATALK scripts also included predefined tags or variable that are reserved words. These tags are not normally redefined by an ATALK script. These predefined tags exist to make the creation of ATALK scripts easier by predefining common tags, such as the DTMF values. The predefined tags in the preferred embodiment are:

| DTMF 0 | Value of DTMF digit '0' |
| DTMF 1 | Value of DTMF digit '1' |
| DTMF 2 | Value of DTMF digit '2' |
| DTMF 3 | Value of DTMF digit '3' |

-continued

| | |
|---|---|
| DTMF 4 | Value of DTMF digit '4' |
| DTMF 5 | Value of DTMF digit '5' |
| DTMF 6 | Value of DTMF digit '6' |
| DTMF 7 | Value of DTMF digit '7' |
| DTMF 8 | Value of DTMF digit '8' |
| DTMF 9 | Value of DTMF digit '9' |
| DTMF A | Value of DTMF digit 'A' |
| DTMF B | Value of DTMF digit 'B' |
| DTMF C | Value of DTMF digit 'C' |
| DTMF D | Value of DTMF digit 'D' |
| DTMF S | Value of DTMF digit '*' |
| DTMF P | Value of DTMF digit '#' |
| DTMF N | Value of NULL DTMF digit |
| SOLICIT_KILL | Don't solicit exit value |
| SOLICIT_OK | Solicitation completed ok |
| SOLICIT_ABORTED | Solicitation process aborted |

ATALK supports 26 built-in unsigned integer variables known as a–z. There is no case sensitivity, thus 'A' is the same variable as 'a', however, for consistency, lower case should be used.

Items known as "semaphores" or flags are employed as a method of interprocess communication, whereby an ATALK script can communicate to external system, such as an order processing system or administrator's system. Each active script may have its own unique set of 255 semaphores that am monitored by the external application program. The requested semaphore is always set to NULL after this operation, thus preventing the same value from being read twice. Certain semaphores are predefined. Semaphore 0 is reserved to contain a flag that indicates how a call was detected. It will contain a '0' if the call detected via a call origination, and a T if the call was detected via an autonomous registration. Semaphore 1 is reserved to contain a number from 0 to 999 representing the cell number of origin. Semaphore 2 is reserved to contain the SCM.

ATALK scripts further include parameters, that are a method of interprocess communication similar to the semaphore system. However, parameters differ from semaphores in that there is only one set of 255 parameters are shared by all scripts. The intended purpose of parameters is to provide scripts with a method to dynamically alter and examine the functionality of the system. Certain parameters are predefined in the present invention. Parameter 0 is reserved to hold the numeric value in an environmental variable CITY. The environmental variable is read by the application upon invocation. For example, if the profile file contained export CITY=5, then parameter '0' will be set to the value '5'.

Next will be described the syntax of the preferred ATALK scripts. The following description includes a list of commands, followed by syntactical definitions:

COMMAND ;
EXAMPLE
　　;This is a comment

DESCRIPTION Any line that contains the ";" (semicolon) character will have all characters to the right of the ";" ignored. Thus, the semicolon signifies a comment line.

COMMAND define(x,y)
EXAMPLE
　　define(Main Greeting, 1204)

DESCRIPTION In the above example, the tag "Main Greeting" is equated to be the same as if 1204 had been written. This is used to make a script more human-readable. The arguments to this command must be composed of alphabetic characters, digits, and the underscore ''. The first character must not be a digit. Leading blanks in the arguments are ignored unless enclosed with ' (grave accent and apostrophe). Each tag defined with this command should be unique, since the definition of a duplicate tag replaces the previous tag, without complaint. The define( ) statements should be placed in a script file prior to the use of a tag, and they should preferably be placed at the top or beginning of the file, oriented to the left margin.

COMMAND S
EXAMPLE
　　S 123 or S Main Greeting　　{ Speak }

DESCRIPTION Speak recorded message number "123" or "Main Greeting". The value "123" must be a decimal number that matches the desired message. This value may optionally be a tag composed of upper or lower case alphabetic characters, digits, and the underscore. The tag must be referenced to a message number at the top of the file with a "define" statement.

COMMAND R
EXAMPLE
　　R b 10　　{ Read }

DESCRIPTION In the above example, wait '10' seconds to record user's DTMF input into variable b, which may be any of the 26 variables, a–z. The wait value must be between 0 and 255 seconds. The script will continue upon user DTMF input, or timeout of the specified seconds. If the user did supply input, the variable will contain the numeric value of the lower case ASCII value that corresponds to the DTMF key that was entered. There are 16 possible DTMF digits, 0–9, A–D, * and #. Additionally, if no input was provided, and a timeout occurred, the variable will contain a NULL value.

COMMAND E　　{ Evaluate }
EXAMPLE
　　E a = 5

DESCRIPTION In the example above, variable 'a' is evaluated to determine if it contains the decimal numeric value '5'. The left side of the expression must be one of the 26 predefined variables, a–z. The fight side of the expression can be another such variable, or a decimal number from 0 to 255. Available expressions are:
　　=equal
　　!=not equal
　　<less than
　　>greater than COMMAND T　　{ True jump}
EXAMPLE
　　T GOT_DTMF DESCRIPTION In the example above, if the most recent 'E' (evaluate) command evaluated an expression to be TRUE, then the script will jump to location 'GOT_DTMF'; otherwise it will fall through to the next command.

| COMMAND | F | { False jump } |
|---|---|---|
| EXAMPLE | | |
| | F DO_ROAM | |

DESCRIPTION In the example above, if the most recent 'E' (evaluate) command evaluated its expression to be FALSE, then the script will jump to location DO_ROAM; otherwise it will fall through to the next command.

| COMMAND | J | { Jump } |
|---|---|---|
| EXAMPLE | | |
| | J DO_AGENT | |

DESCRIPTION In the example above, the script will immediately jump to location "DO_AGENT".

| COMMAND | A | { Assign } |
|---|---|---|
| EXAMPLE | | |
| | A b = 3 | |

DESCRIPTION In the example above, variable 'b' is assigned the decimal numerical value of '3'. The left side of the expression must be one of the built-in 26 variables, a–z. The right side of the expression may be another such variable, a decimal value of 0 to 255, or a tag previously established with a define( ) command. Available expressions are:

Numerical

= set equal to
Arithmetic

+ right value is added to left value
− right value is subtracted from left value
* left value is multiplied by right value
/ left value is divided by right value
Boolean

| bitwise or the two values
& bitwise and the two values
Bit Manipulation

> shift right by value of right expression side
< shift left by value of right expression side

| COMMAND | P | { Post a semaphore } |
|---|---|---|
| EXAMPLE | | |
| | P 52 2 or P SEM_USER_REQ ABORT | |

DESCRIPTION In the example above, semaphore '52' is posted with the decimal numerical value of '2'. Either data may be one of the built-in 26 variables, a–z, a decimal value of 0 to 255, or a tag previously established with a define( ) command. The semaphore is a method of interprocess communication, whereby the current script can communicate to another application. Each active script has its own unique set of 255 semaphores that are monitored by another application program.

| COMMAND | V | { check semaphore eVent } |
|---|---|---|
| EXAMPLE | | |
| | V n 14 or V n SEM_REQ_REPLY | |

DESCRIPTION In the example above, variable 'n' is assigned the decimal numerical value contained in semaphore 14. The left data item must be one of the built-in 26 variables, a–z. The right data item may be another such variable, a decimal value of 0 to 255, or a tag previously established with a define( ) command. The requested semaphore is always set to NULL after this operation, thus preventing the same value from being read twice.

| COMMAND | X | |
|---|---|---|
| EXAMPLE | | |
| | X 99 | { eXit } |

DESCRIPTION In the example above, the current execution of this script is exited, and the value of '99' is returned to the primary application. The return value must be one of the built-in 26 variables, a–z, a decimal value of 0 to 255, or a tag previously established with a define( ) command.

| COMMAND | W | { Write a log message } |
|---|---|---|
| EXAMPLE | | |
| | W z this is a log message | |

DESCRIPTION The 'W' command requires two arguments. The first argument must be one of the built-in 26 variables, a–z, a decimal value of 0 to 255, or a tag previously established with a define( ) command. The remainder of the line after the first argument is treated as an ASCII text string. Both arguments are written to a log device (such as a printer or serial port) in ASCII form, for diagnostic purposes. It is suggested that all characters in the text be lower case in order to avoid collisions with reserved words defined elsewhere in the script with the define( ) command.

| COMMAND | M | { Modify parameter } |
|---|---|---|
| EXAMPLE | | |
| | M 0 5 or M PARM_HANGUP 5 | |

DESCRIPTION In the example above, parameter 0 is assigned the decimal numerical value of '5'. Both data items must be one of the built-in 26 variables, a–z, a decimal value of 0 to 255, or a tag previously established with a define( ) command. Parameters are a method of interprocess communication similar to the semaphore system, however, they differ from semaphores in that there is only one set of 255 parameters shared by all scripts. The intended purpose of parameters is to provide scripts with a method to dynamically alter and examine the functionality of the system.

| COMMAND | F | { Fetch parameter } |
|---|---|---|
| EXAMPLE | | |
| | F a 0 or F a PARM_HANGUP | |

DESCRIPTION In the example above, parameter 0 is fetched and its value is placed into variable 'a'. Both data items must be one of the built-in 26 variables, a–z, a decimal value of 0 to 255, or a tag previously established with a define( ) command.

Now that the preferred script syntax has been described, next an example of an ATALK script will be provided. Assume that message S_Welcome contains the speech message, "This is a free call from BellSouth Mobility. If you are interested in our roaming services, please press one on your cellular telephone, if you are not interested, and wish to never be solicited again, press nine". Given this speech, the following is an exemplary ATALK script which carries out the steps shown in FIG. 9:

```
;DEFINE SPEECH TAGS
define(Wait_4_Key,15)
_L_START:
    S S_Welcome        ; speak greeting
    R a Wait_4_Key     ; read DTMF input into variable 'a'
                       ; wait up to 15 seconds for a reply.
    E a = DTMF_1       ; test 'a' for '1' key entry
    T_L_ROAM           ; jump to roam info section
    E a = DTMF_9       ; test 'a' for '9' key entry
    T_L_KILL           ; jump to kill solicitation section
    E a = DTMF_N       ; check for no DTMF response
    T_L_TRY_LATER      ; inform main process of
                       ; null solicitation
    S S_Bad_Key        ; Speak "Invalid choice, try again"
    J_L_START          ; incorrect response, try again
_L_KILL:
    S S_Kill_Done      ; Inform customer request granted
    X SOLICIT_KILL
_L_ROAM:
    S S_Roam_Info      ; speak roamer info message
    X SOLICIT_OK
_L_TRY LATER:
    S S_Try_Later      ; Inform customer of future contact try
    X SOLICIT_
    ABORTED
```

The following is the ATALK script native version of the example program listed above:

```
1      S 1
2      R a 15
3      E a = 49
4      T 13
5      E a = 57
6      T 11
7      E a = 0
8      T 15
9      S 2
10     J 1
11     S 3
12     X 2
13     S 4
14     X 0
15     S 5
16     X 1
```

In the preferred embodiment, digitized speech messages are contained in a speech file consisting of speech segments. Each speech segment has a prompt number, name, offset and length. These parameters are written to a message length description file by a speech editor program supplied by the vendor of the voice synthesizer and telephone interface circuit 70. An example is shown below.

```
PROMPT 1    Length: 4.92 sec    Offset: 264     Bytes: 14881
NOTE: S_Welcome
PROMPT 2    Length: 15.77 sec   Offset: 15145   Bytes: 47715
NOTE: S_Bad_Key
PROMPT 3    Length: 3.72 sec    Offset: 62860   Bytes: 11249
NOTE: S_Kill_Done
PROMPT 4    Length: 3.02 sec    Offset: 74109   Bytes: 9152
```

```
NOTE: S_Roam_Info
PROMPT 5    Length: 15.16 sec   Offset: 101904  Bytes: 45866
NOTE: S_Try_Later
PROMPT 6    Length: 18.49 sec   Offset: 147770  Bytes: 55947
NOTE: No Annotation Text
```

In summary, there has been illustrated and described an improved method and apparatus for providing an automated and interactive customer class identification and contacting system for a cellular mobile radiotelephone network. Means have been described for monitoring identification information provided by a registering mobile radiotelephone as it registers into the CMR system by powering up or entering the area of coverage of a cell of the system for the first time. Means have been described that are responsive to the identification information for detecting predetermined identifying characteristics of the registering mobile radiotelephone, for example, whether it is a home unit or a roamer. Means have been described that are responsive to detection of a selected predetermined identifying characteristic of the registering mobile radiotelephone for communicating with the radiotelephone such as by providing information about services that may be obtained from the cellular system operator. Means have been described for receiving responses of the radiotelephone user to a solicitation or request for information.

Therefore, while a particular preferred embodiment of the invention has been shown and described, it should be understood that the preferred embodiment has been disclosed by way of example, and it will be understood that other modifications may occur to those skilled in the art without departing from the scope and the spirit of the appended claims.

What is claimed is:

1. In or for a cellular mobile radiotelephone (CMR) system, an automated customer class identification and contacting system, comprising:

means for monitoring identification information provided by an autonomously registering mobile radiotelephone as it autonomously registers into said CMR system by powering up or entering an area of coverage of a cell of said CMR system;

means responsive to said identification information for detecting predetermined identifying characteristics of said autonomously registering mobile radiotelephone; and communicating means responsive to detection of a selected predetermined identifying characteristic of said autonomously registering mobile radiotelephone for initiating a voice channel communication with a selected autonomously registering mobile radiotelephone having said selected predetermined identifying characteristic.

2. The system of claim 1, further comprising interactive means for delivering an audio message to said autonomously registering mobile radiotelephone via said voice channel communication and for receiving responses to a message delivered to said autonomously registering mobile radiotelephone.

3. The system of claim 2, wherein said interactive means comprises means for delivering a voice message to said autonomously registering mobile radiotelephone and means for receiving responses via dual-tone multifrequency tones provided by a user of said autonomously registering mobile radiotelephone.

4. The system of claim 1, wherein said communicating means provides a class targeted communication directed to members of a predetermined class of mobile radiotelephones, and wherein said communicating means comprises means for placing a telephone call to said autonomously registering mobile radiotelephone, and means for delivering said class targeted communication if the call to said autonomously registering mobile radiotelephone is answered.

5. The system of claim 4, wherein said means for providing a class targeted communication comprises voice message means for generating a voice message.

6. The system of claim 5, wherein said voice message means comprises: (1) a preprogrammed voice message script corresponding to a predetermined message, (2) means responsive to said preprogrammed voice message script for generating a synthesized voice, and (3) means for delivering said synthesized voice to said autonomously registering mobile radiotelephone.

7. The system of claim 5, wherein said predetermined identifying characteristic corresponds to a roamer unit, and wherein said class targeted communication comprises a service related to roamers in said CMR system.

8. The system of claim 5, wherein said predetermined identifying characteristic corresponds to a local or home unit of said CMR system, and wherein said class targeted communication comprises a service related to owners of local or home units of said CMR system.

9. The system of claim 5, wherein said predetermined identifying characteristic corresponds to at least a portion of the mobile telephone number associated with the mobile radiotelephone.

10. The system of claim 9, wherein said portion of said mobile telephone number is employed to determine whether said autonomously registering mobile radiotelephone is in a predetermined geographic class of customers of said CMR system, and wherein said class targeted communication comprises information related to a service offered to said predetermined geographic class of customers of said CMR system.

11. The system of claim 5, wherein said predetermined identifying characteristic corresponds to a station class mark (SCM) identifier associated with said mobile radiotelephone.

12. The system of claim 11, wherein said SCM is employed to determine whether said autonomously registering mobile radiotelephone is of a particular type of mobile radiotelephone, and wherein said class targeted communication comprises information related to a service provided by the operator of the CMR system to owners of said particular type of mobile radiotelephone.

13. The system of claim 5, wherein said predetermined identifying characteristic corresponds to at least a portion of the electronic serial number (ESN) associated with said mobile radiotelephone.

14. The system of claim 13, wherein said ESN is employed to determine whether said autonomously registering mobile radiotelephone is of a type made by a particular manufacturer, and wherein said class targeted communication comprises a service related to owners of mobile radiotelephones made by said particular manufacturer.

15. The system of claim 5, wherein said predetermined identifying characteristic identifies said autonomously registering mobile radiotelephone as a unit which has been sold preconfigured to the system identification of the operator of the CMR system, wherein said voice message relates to the provision of services offered by the operator of said CMR system to a newly subscribing customer.

16. The system of claim 15, wherein the service offered by the CMR system operator is to automatically contact customer service of the operator of the CMR system, utilize the identification information associated with said autonomously registering mobile radiotelephone, solicit billing identity and address information from the user, and initiate regular cellular service for the user based on such identification information and billing identity and address information, for automatic customer subscription.

17. The system of claim 1, wherein said means for monitoring identification information comprises:

means connected to receive registration signals communicated to a mobile telephone switching office from a cell site; and means for determining whether a received registration signal corresponds to a home unit or a roamer unit.

18. The system of claim 17, wherein said means for detecting predetermined identifying characteristics comprises:

means responsive to said determining means and said received registration signals for providing, as said predetermined identifying characteristics, identification information only for a preselected category of said autonomously registering mobile radiotelephones.

19. The system of claim 1, further comprising means for storing status information associated with said communicating means.

20. The system of claim 19, wherein said status information storing means comprises a computer database.

21. The system of claim 19, wherein said status information comprises information comprises data selected from group consisting of:

(1) data indicating that said autonomously registering mobile radiotelephone has never been solicited, (2) data indicating that said autonomously registering mobile radiotelephone has not been detected within a predetermined time period, (3) data indicating that said autonomously registering mobile radiotelephone has not been solicited within a predetermined time period, (4) data indicating that said autonomously registering mobile radiotelephone has communicated a command to block solicitations; and (5) data indicating that said autonomously registering mobile radiotelephone has communicated a command to select a service offered by the operator of said CMR system.

22. The system of claim 19, further comprising means for detecting responses of said communicating means from communications with said autonomously registering mobile radiotelephone, and wherein said status information storing means stores said detected responses as said status information.

23. The system of claim 22, wherein said detected responses of said communicating means includes data indicative of a successful or unsuccessful communication with said autonomously registering mobile radiotelephone, and further comprising means responsive to said detected responses stored in said status data storing means for causing said communicating means to reattempt to communicate with said autonomously registering mobile radiotelephone in the event of an unsuccessful communication.

24. The system of claim 22, wherein said detected responses of said communicating means include data indicative of a reply of a user of said autonomously registering mobile radiotelephone to a communication provided by said communicating means, and wherein said status data storing means provides said detected responses as an output.

25. The system of claim 1, wherein said communicating means comprises:

solicitation means for placing a telephone call to the telephone number of said autonomously registering mobile radiotelephone;

means responsive to a successful connection by said solicitation means of said autonomously registering mobile radiotelephone for delivering a predetermined message via a voice channel.

26. The system of claim 1, wherein said communicating means comprises:

solicitation means for placing a telephone call to said selected autonomously registering mobile radiotelephone;

call completion means for determining whether the telephone call placed by said solicitation means was completed and for setting a solicit fail flag in response to an incompleted telephone call, said solicit fail flag being associated with the telephone number of said selected autonomously registering mobile radiotelephone;

means responsive to said solicit fail flags for scheduling a predetermined number of subsequent attempts for said solicitation means to place telephone call to said selected autonomously registering mobile radiotelephone;

means responsive to a successful connection by said solicitation means of said selected autonomously registering mobile radiotelephone for delivering a predetermined voice message via a voice channel.

27. The system of claim 26, wherein said communicating means further comprises dual-tone multifrequency (DTMF) means responsive to DTMF signals provided by a user at said autonomously registering mobile radiotelephone for receiving input from said user in response to said predetermined voice message, and means for providing an output data item corresponding to the input received from the user.

28. The system of claim 26, wherein said autonomously registering mobile radiotelephone is a roamer, said predetermined voice message comprises a message related to the provision of optional roaming services provided by the operator of said CMR system to roamers, and said output data item relates to the selection or rejection of said roaming services by the user of said autonomously registering mobile radiotelephone.

29. The system of claim 26, wherein said autonomously registering mobile radiotelephone is a home or local unit, said predetermined voice message comprises a message related to provision of services for local customers in said CMR system, and said output data item relates to the selection or rejection of said services by the user of said autonomously registering mobile radiotelephone.

30. The system of claim 26 wherein said autonomously registering mobile radiotelephone has a mobile telephone number indicative of a predetermined geographic area, said predetermined voice message comprises a message related to an offering of goods or services provided by an operator of said CMR system to customers within said predetermined geographic area, and said output data item relates to selection or rejection of said goods or services by the user of said autonomously registering mobile radiotelephone.

31. The system of claim 26, wherein said predetermined voice message comprises a message related to a telephone survey conducted by an operator of said CMR system, and said output data item relates to the response to the telephone survey by the user of said autonomously registering mobile radiotelephone.

32. In or for a cellular mobile radiotelephone (CMR) system, a method for automatically identifying customers by class identification and contacting predetermined classes of customers, comprising the steps of:

monitoring identification information provided by an autonomously registering mobile radiotelephone as it registers into said CMR system by powering up or entering the area of coverage of a cell of said CMR system;

detecting predetermined identifying characteristics of said autonomously registering mobile radiotelephone from the identification information; and initiating a voice channel communication with a selected autonomously registering mobile radiotelephone having a selected predetermined identifying characteristic.

33. The method of claim 32, further comprising the steps of delivering a message to said autonomously registering mobile radiotelephone and receiving responses to a message delivered to said autonomously registering mobile radiotelephone.

34. The method of claim 32, wherein the step of delivering a message to said autonomously registering mobile radiotelephone comprises delivering a voice message to said autonomously registering mobile radiotelephone and receiving responses via dual-tone multifrequency tones provided by a user of said autonomously registering mobile radiotelephone.

35. The method of claim 32, further comprising the steps of providing a class targeted communication directed to members of a predetermined class of mobile radiotelephones, and wherein the step of communicating with said autonomously registering mobile radiotelephone comprises the steps of: (1) placing a telephone call to said autonomously registering mobile radiotelephone, and (2) delivering the class targeted communication if the call to said autonomously registering mobile radiotelephone is answered.

36. The method of claim 35, wherein the step of providing a class targeted communication comprises generating a voice message.

37. The method of claim 36, wherein the step of generating a voice message comprises the steps of: (1) providing a preprogrammed voice message script corresponding to a predetermined message, (2) generating a synthesized voice corresponding to the preprogrammed voice message script, and (3) delivering the synthesized voice to said autonomously registering mobile radiotelephone.

38. The method of claim 37, wherein said predetermined identifying characteristic corresponds to a roamer unit, and wherein said class targeted communication comprises a service related to roamers in the CMR system.

39. The method of claim 37, wherein said predetermined identifying characteristic corresponds to a local or home unit of said CMR system, and wherein said class targeted communication comprises a service related to owners of local or home units of said CMR system.

40. The method of claim 37, wherein the predetermined identifying characteristic corresponds to at least a portion of the mobile telephone number associated with the mobile radiotelephone.

41. The method of claim 40, wherein the portion of said mobile telephone number is employed to determine whether said autonomously registering mobile radiotelephone is in a predetermined geographic class of customers of the CMR system, and wherein the class targeted communication comprises information related to a service offered to the predetermined geographic class of customers of said CMR system.

42. The method of claim 37, wherein the predetermined identifying characteristic corresponds to a station class mark (SCM) identifier associated with the mobile radiotelephone.

43. The method of claim 42, wherein the SCM is employed to determine whether said autonomously registering mobile radiotelephone is of a particular type of mobile radiotelephone, and wherein the class targeted communication comprises information related to a service offered by the operator of the CMR to owners of the particular type of mobile radiotelephone.

44. The method of claim 37, wherein the predetermined identifying characteristic corresponds to at least a portion of the electronic serial number (ESN) associated with said autonomously registering mobile radiotelephone.

45. The method of claim 44, wherein the ESN is employed to determine whether said autonomously registering mobile radiotelephone is of a type made by a particular manufacturer, and wherein the class targeted communication comprises information related to owners of mobile radiotelephones made by the particular manufacturer.

46. The method of claim 37, wherein the predetermined identifying characteristic identifies said autonomously registering mobile radiotelephone as a unit which has been sold preconfigured to the system identification of the operator of the CMR system, wherein the voice message relates to the provision of services offered by the operator of said CMR system to a newly subscribing customer.

47. The method of claim 46, further comprising the steps of automatically contacting customer service of the operator of the CMR system, providing the identification information associated with said autonomously registering mobile radiotelephone to customer service, interactively soliciting billing identity and address information from the user of said autonomously registering mobile radiotelephone, and initiating regular cellular service for the user based on such identification information and billing identity and address information, for automatic customer subscription.

48. The method of claim 32, wherein the step of monitoring identification information comprises:

receiving registration signals communicated to a mobile telephone switching office from a cell site; and determining whether the received registration signals correspond to a home unit or a roamer unit.

49. The method of claim 48, wherein the step of detecting predetermined identifying characteristics comprises the step of providing, as the predetermined identifying characteristics, identification information only for a preselected category of autonomously registering mobile radiotelephones.

50. The method of claim 32, further comprising the step of storing status information associated with said autonomously registering mobile radiotelephone.

51. The method of claim 50, wherein the status information is stored in a computer database.

52. The method of claim 50, wherein the status information comprises data selected from group consisting of:

(1) data indicating that said autonomously registering mobile radiotelephone has never been solicited, (2) data indicating that said autonomously registering mobile radiotelephone has not been detected within a predetermined time period, (3) data indicating that said autonomously registering mobile radiotelephone has not been solicited within a predetermined time period, (4) data indicating that said autonomously registering mobile radiotelephone has communicated a command to block solicitations; and (5) data indicating that said autonomously registering mobile radiotelephone has communicated a command to select a service offered by the operator of the CMR system.

53. The method of claim 51, further comprising the step of detecting responses from said autonomously registering mobile radiotelephone, and storing the detected responses as status information in said computer database.

54. The method of claim 53, wherein the detected responses includes data indicative of a successful or unsuccessful communication with said autonomously registering mobile radiotelephone, and further comprising the step of reattempting to communicate with said autonomously registering mobile radiotelephone in the event of an unsuccessful communication.

55. The method of claim 53, wherein the detected responses include data indicative of a reply of a user of said autonomously registering mobile radiotelephone to a communication, and further comprising the step of providing the detected responses as an output.

56. The method of claim 32, wherein the step of communicating with said autonomously registering mobile radiotelephone comprises the steps of:

placing a telephone call to the telephone number of said autonomously registering mobile radiotelephone;

responsive to a successful connection with said autonomously registering mobile radiotelephone, delivering a predetermined message via a voice channel.

57. The method of claim 32, wherein the step of communicating with said selected autonomously registering mobile radiotelephone comprises the steps of:

placing a telephone call to said selected autonomously registering mobile radiotelephone;

determining whether the telephone call was completed and setting a solicit fail flag in response to an incompleted telephone call, the solicit fail flag being associated with the mobile telephone number of said selected autonomously registering mobile radiotelephone;

responsive to said solicit fail flag, scheduling a predetermined number of subsequent attempts to place a telephone call to said selected autonomously registering mobile radiotelephone; and responsive to a successful connection, delivering a predetermined voice message via a voice channel.

58. The method of claim 57, further comprising the steps of receiving dual-tone multifrequency signals provided by a user at said autonomously registering mobile radiotelephone as input from the user in response to the predetermined voice message, and providing an output data item corresponding to the input received from the user.

59. The method of claim 57, wherein said autonomously registering mobile radiotelephone is a roamer, the predetermined voice message comprises a message related to the provision of roaming services provided by the operator of the CMR system to roamers, and said output data item relates to the selection or rejection of roaming services by the user of said autonomously registering mobile radiotelephone.

60. The method of claim 57, wherein said autonomously registering mobile radiotelephone is a home or local unit, the predetermined voice message comprises a message related to provision of services for local customers, and the output data item relates to the selection or rejection of said services by the user of said autonomously registering mobile radiotelephone.

61. The method of claim 57, wherein said autonomously registering mobile radiotelephone has a mobile telephone number indicative of a predetermined geographic area, the predetermined voice message comprises a message related to an offering of goods or services provided to customers within the predetermined geographic area, and the output data item relates to the selection or rejection of goods or services by the user of said autonomously registering mobile radiotelephone.

62. The method of claim 57, wherein the predetermined voice message comprises a message related to a telephone survey conducted by an operator of the CMR system, and the output data item relates to the response of the user of said autonomously registering mobile radiotelephone to the telephone survey.

63. In or for a cellular mobile radiotelephone (CMR), an automated customer class identification and contacting system, comprising:

means for monitoring identification information provided by an autonomously registering mobile radiotelephone as it registers into said CMR system by powering up or entering an area of coverage of a cell of said CMR system;

detection means connected to said monitoring means for providing a mobile telephone number, electronic serial number, and station class mark information of said autonomously registering mobile radiotelephone as a serial data stream;

database means responsive to said serial data stream determining whether said autonomously registering mobile radiotelephone is within a predetermined class of mobile radiotelephones and for providing a solicitation request targeted to said predetermined class of mobile radiotelephones;

solicitation means responsive to said solicitation request for soliciting said autonomously registering mobile radiotelephone by placing a call to said mobile telephone number of said autonomously registering mobile radiotelephone; and response detection means for determining a response of said autonomously registering mobile radiotelephone to the call placed by said solicitation means and for providing response information output.

64. The system of claim 63, wherein said database means is operative for searching on the mobile telephone number of each said autonomously registering mobile radiotelephone and determining whether said autonomously registering mobile radiotelephone has never been solicited or has been neither detected nor solicited within a predetermined time period.

65. The system of claim 63, further comprising message delivering means for delivering a message to said autonomously registering mobile radiotelephone in response to a successful connection to said autonomously registering mobile radiotelephone by said solicitation means.

66. The system of claim 65, wherein said message delivering means comprises a voice message generator.

67. The system of claim 66, wherein said voice message generator comprises: (1) a preprogrammed voice message script corresponding to a predetermined message, (2) means responsive to said preprogrammed voice message script for generating a synthesized voice, and (3) means for delivering said synthesized voice to said autonomously registering mobile radiotelephone.

68. The system of claim 63, wherein said response detection means comprises means for detecting whether said call placed by said solicitation means was completed or not, and further comprising means for providing a solicit fail flag to said database means in response to detection of an incomplete call.

69. The system of claim 63, wherein said response detection means comprises means for detecting a reply of a user of said autonomously registering mobile radiotelephone to a call initiated by said solicitation means, and wherein said database means stores said user reply.

70. The system of claim 69, wherein said reply detecting means comprises a dual-tone multifrequency detection circuit.

71. The system of claim 63, wherein said autonomously registering mobile radiotelephone is a roamer, said solicitation means provides a message related to the provision of roaming services provided by the operator of said CMR system to roamers, and said database means stores data related to the selection or rejection of roaming services by the user of said autonomously registering mobile radiotelephone.

72. In or for a cellular mobile radiotelephone (CMR), an automated detecting and contacting system, comprising:

means for monitoring identification information provided by an autonomously registering mobile radiotelephone as it registers into said CMR system by powering up or entering an area of coverage of a cell of said CMR system;

detection means connected to said monitoring means for providing a mobile telephone number, electronic serial number, and station class mark information of said autonomously registering mobile radiotelephone as a serial data stream;

database means responsive to said serial data stream determining whether said autonomously registering mobile radiotelephone is a roamer and for providing a solicitation request targeted to said roamer;

solicitation means responsive to said solicitation request for soliciting said autonomously registering mobile radiotelephone by placing a call to said mobile telephone number of said roamer; and response detection means for determining a response of said roamer to the call placed by said solicitation means and for providing a response information output.

73. The system of claim 72, wherein said database means is operative for searching on the mobile telephone number of said roamer and determining whether said roamer has never been solicited or has been neither detected nor solicited within a predetermined time period.

74. The system of claim 73, further comprising message delivering means for delivering a message to said roamer in response to a successful connection to said autonomously registering mobile radiotelephone by said solicitation means.

75. The system of claim 74, wherein said message delivering means comprises a voice message generator.

76. The system of claim 75, wherein said voice message generator comprises: (1) a preprogrammed voice message script corresponding to a predetermined message, (2) means responsive to said preprogrammed voice message script for generating a synthesized voice, and (3) means for delivering said synthesized voice to said autonomously registering mobile radiotelephone.

77. The system of claim 72, wherein said response detection means comprises means for detecting whether said call placed by said solicitation means was completed or not, and further comprising means for providing a solicit fail flag to said database means in response to detection of an incomplete call.

78. The system of claim 72, wherein said response detection means comprises means for detecting a reply by the roamer to a call initiated by said solicitation means, and wherein said database means stores said user reply.

79. The system of claim 78, wherein said reply detecting means comprises a dual-tone multifrequency detection circuit.

80. The system of claim 72, wherein said solicitation means provides a message related to the provision of roaming services provided by the operator of said CMR system to roamers, and said database means stores data related to the selection or rejection of roaming services by the roamer.

81. The system of claim 1, further comprising message means for delivering a message to said autonomously registering mobile radiotelephone.

82. The system of claim 81, wherein said message means comprises means for delivering a voice message to said autonomously registering mobile radiotelephone.

83. The system of claim 1, further comprising response means for receiving responses from said autonomously registering mobile radiotelephone.

84. The system of claim 83 wherein said response means comprises means for receiving responses via DTMF tones provided by a user of said autonomously registering mobile radiotelephone.

85. The system of claim 1, wherein said means for monitoring identification information comprises means for receiving signaling data contained in a cell to MTSO data link.

86. The system of claim 1 wherein said predetermined identifying characteristic identifies said autonomously registering mobile radiotelephone as a home unit, and wherein said communicating means is operative to provide a voice message on said voice channel relating to the provision of a service offered by an operator of said CMR system to a home unit.

87. The system of claim 1, wherein said predetermined identifying characteristic identifies said autonomously registering mobile radiotelephone as a roamer, and wherein said communicating means is operative to provide a voice message on said voice channel relating to the provision of a service offered by an operator of said CMR system to a roamer.

88. In or for a cellular mobile radiotelephone (CMR) system, an automated customer class identification and contacting system, comprising:

means for monitoring identification information provided by an autonomously registering mobile radiotelephone as it registers into said CMR system by powering up or entering the area of coverage of a cell of said CMR system;

means responsive to said identification information for detecting predetermined identifying characteristics of autonomously registering mobile radiotelephones and for identifying a selected mobile radiotelephone having a selected predetermined identifying characteristic;

interactive voice message delivery and response receiving means; and means responsive to detection of a selected predetermined identifying characteristic of said autonomously registering mobile radiotelephone for connecting said interactive voice message delivery and response receiving means for interactive communications with a selected autonomously registering mobile radiotelephone having said selected predetermined identifying characteristic.

89. The system of claim 88, wherein said interactive voice message delivery and response receiving means is operative for delivering an audio message to said selected autonomously registering mobile radiotelephone via a voice channel communication and for receiving responses to a message delivered to said autonomously registering mobile radiotelephone.

90. The system of claim 89, wherein said interactive voice message delivery and response receiving means comprises means for delivering a voice message to said selected autonomously registering mobile radiotelephone and means for receiving responses via dual-tone multifrequency tones provided by a user of said selected autonomously registering mobile radiotelephone.

91. The system of claim 90, wherein said interactive voice message delivery and response receiving means provides a class targeted communication directed to members of a predetermined class of mobile radiotelephones, and comprises means for placing a telephone call to said selected autonomously registering mobile radiotelephone, and means for delivering said class targeted communication if the call to said autonomously registering mobile radiotelephone is answered.

92. The system of claim 91, wherein said interactive voice message delivery and response receiving means comprises means for generating a voice message.

93. The system of claim 92, wherein said voice message means comprises: (1) a preprogrammed voice message script corresponding to a predetermined message, (2) means responsive to said preprogrammed voice message script for generating a synthesized voice, and (3) means for delivering said synthesized voice to said selected autonomously registering mobile radiotelephone.

94. The system of claim 91, wherein said predetermined identifying characteristic corresponds to a roamer unit, and wherein said class targeted communication comprises a service related to roamers in said CMR system.

95. The system of claim 91, wherein said predetermined identifying characteristic corresponds to a local or home unit of said CMR system, and wherein said class targeted communication comprises a service related to owners of local or home units of said CMR system.

96. The system of claim 91, wherein said predetermined identifying characteristic corresponds to at least a portion of the mobile telephone number associated with a mobile radiotelephone.

97. The system of claim 96, wherein said portion of said mobile telephone number is employed to determine whether said autonomously registering mobile radiotelephone is in a predetermined geographic class of customers of said CMR system, and wherein said class targeted communication comprises information related to a service offered to said predetermined geographic class of customers of said CMR system.

98. The system of claim 91, wherein said predetermined identifying characteristic corresponds to a station class mark (SCM) identifier associated with said mobile radiotelephone.

99. The system of claim 98, wherein said SCM is employed to determine whether said autonomously registering mobile radiotelephone is of a particular type of mobile radiotelephone, and wherein said class targeted communication comprises information related to a service provided by an operator of a CMR system to owners of said particular type of mobile radiotelephone.

100. The system of claim 91, wherein said predetermined identifying characteristic corresponds to at least a portion of the electronic serial number (ESN) associated with said mobile radiotelephone.

101. The system of claim 100, wherein said ESN is employed to determine whether said autonomously registering mobile radiotelephone is of a type made by a particular manufacturer, and wherein said class targeted communication comprises a service related to owners of mobile radiotelephones made by said particular manufacturer.

102. The system of claim 91, wherein said predetermined identifying characteristic identifies said autonomously registering mobile radiotelephone as a unit which has been sold preconfigured to the particular system identification of a operator of the CMR system, wherein said voice message relates to the provision of a service offered by said operator of said CMR system to a newly subscribing customer.

103. The system of claim 102, wherein said service offered by the CMR system operator is to automatically contact customer service of said operator of said CMR system, utilize the identification information associated with said selected autonomously registering mobile radiotelephone, solicit billing identity and address information from the user of said selected autonomously registering mobile radiotelephone, and initiate regular cellular service for said user based on such identification information and billing identity and address information, for automatic customer subscription.

104. The system of claim 88, wherein said predetermined identifying characteristic identifies said autonomously registering mobile radiotelephone as a home unit, and wherein said interactive voice message delivery and response receiving means is operative to provide a voice message relating to the provision of a service offered by an operator of said CMR system to a home unit.

105. The system of claim 88, wherein said predetermined identifying characteristic identifies said autonomously registering mobile radiotelephone as a roamer, and wherein said interactive voice message delivery and response receiving means is operative to provide a voice message relating to the provision of a service offered by an operator of said CMR system to a roamer.

106. The system of claim 88, wherein said means for monitoring identification information comprises:
    means connected to receive registration signals communicated to a mobile telephone switching office from a cell site; and
    means for determining whether a received registration signal corresponds to a home unit or a roamer unit.

107. The system of claim 106, wherein said means for detecting predetermined identifying characteristics comprises:
    means responsive to said determining means and said received registration signals for providing, as said predetermined identifying characteristic, identification information only for a preselected category of said autonomously registering mobile radiotelephones.

108. The system of claim 88, further comprising means for storing status information associated with said interactive voice message delivery and response receiving means.

109. The system of claim 108, wherein said status information storing means comprises a computer database.

110. The system of claim 108, wherein said status information comprises information comprises data selected from group consisting of:
    (1) data indicating that said selected autonomously registering mobile radiotelephone has never been solicited,
    (2) data indicating that said selected autonomously registering mobile radiotelephone has not been detected within a predetermined time period,
    (3) data indicating that said selected autonomously registering mobile radiotelephone has not been solicited within a predetermined time period,
    (4) data indicating that said selected autonomously registering mobile radiotelephone has communicated a command to block solicitations; and
    (5) data indicating that said selected autonomously registering mobile radiotelephone has communicated a command to select a service offered by an operator of said CMR system.

111. The system of claim 108, wherein said status information storing means stores responses received from said selected autonomously registering mobile radiotelephone as said status information.

112. The system of claim 111, wherein said responses received from said selected autonomously registering mobile radiotelephone includes data indicative of a successful or unsuccessful communication with said selected autonomously registering mobile radiotelephone, and further comprising means responsive to data stored in said status data storing means for causing said interactive means to reattempt to communicate with said selected autonomously registering mobile radiotelephone in the event of an unsuccessful communication.

113. The system of claim 111, wherein said responses received from said selected autonomously registering mobile radiotelephone include data indicative of a reply of a user of said selected autonomously registering mobile radiotelephone to a communication provided by said interactive means.

114. The system of claim 88, wherein said interactive means comprises:
    solicitation means for placing a telephone call to the telephone number of said selected autonomously registering mobile radiotelephone;
    means responsive to a successful connection by said solicitation means of said selected autonomously registering mobile radiotelephone for delivering a predetermined voice message via a voice channel.

115. The system of claim 88, wherein said interactive means comprises:
    solicitation means for placing a telephone call to said selected autonomously registering mobile radiotelephone;
    call completion means for determining whether the telephone call placed by said solicitation means was completed and for setting a solicit fail flag in response to an incompleted telephone call, said solicit fail flag being associated with said selected autonomously registering mobile radiotelephone;
    means responsive to said solicit fail flag for scheduling a predetermined number of subsequent attempts for said solicitation means to place telephone call to selected autonomously registering mobile radiotelephone having said solicit fail flag;
    means responsive to a successful connection by said solicitation means of said selected autonomously registering mobile radiotelephone for delivering a predetermined voice message via a voice channel.

116. The system of claim 115, wherein said interactive means further comprises dual-tone multifrequency (DTMF) means responsive to DTMF signals provided by a user at said selected autonomously registering mobile radiotelephone for receiving input from said user in response to said predetermined voice message, and means for providing an output data item corresponding to the input received from said user.

117. The system of claim 115, wherein said selected autonomously registering mobile radiotelephone is a roamer, said predetermined voice message comprises a message related to provision of optional roaming services provided by an operator of said CMR system to roamers, and said output data item relates to selection or rejection of said roaming services by said user of said selected autonomously registering mobile radiotelephone.

118. The system of claim 115, wherein said selected autonomously registering mobile radiotelephone is a home or local unit, said predetermined voice message comprises a message related to provision of a service for local customers in said CMR system, and said output data item relates to selection or rejection of said service by said user of said selected autonomously registering mobile radiotelephone.

119. The system of claim 115, wherein said selected autonomously registering mobile radiotelephone has a mobile telephone number indicative of a predetermined geographic area, said predetermined voice message comprises a message related to an offering of goods or services provided by an operator of said CMR system to customers within said predetermined geographic area, and said output data item relates to selection or rejection of said goods or services by said user of said autonomously registering mobile radiotelephone.

120. The system of claim 115, wherein said predetermined voice message comprises a message related to a telephone survey conducted by an operator of said CMR system, and said output data item relates to a response to said telephone survey by said user of said selected autonomously registering mobile radiotelephone.

* * * * *